3,058,941
Patented Oct. 16, 1962

3,058,941
COMPOSITIONS COMPRISING AN ORGANIC POLYMER AND AN ORGANO PHOSPHORUS COMPOUND
Gail H. Birum, Dayton, Ohio, assignor to Monsanto Chemical Company, St. Louis, Mo., a corporation of Delaware
No Drawing. Filed Dec. 14, 1959, Ser. No. 859,153
21 Claims. (Cl. 260—30.6)

The present invention relates to improved organic materials, and more particularly deals with highly polymeric substances such as are employed in the manufacture of molding and extruding compositions, films, sheets, fibers, textiles, papers, surfacing or coating compositions, impregnating agents, solid foams, rubbers, etc. The invention provides compositions comprising such polymeric substances in combination with an adjuvant therefor which has the ability to modify in a favorable way the properties of the polymer.

Numerous adjuvants for use wtih natural and synthetic highly polymeric materials are known in the art, and in most instances such adjuvants are capable only of modifying one property of a polymer or of a narrow class of polymers. Thus, while numerous compounds are known to plasticize a class of vinyl polymers such as the vinyl chloride polymers, the same compounds generally do not stabilize these polymers against heat and/or light, not do the same compounds possess plasticizing effect on another type of vinyl polymer such as polymethacrylates. Also, while a few known adjuvants possess a broad spectrum of efficiency with respect to one class of polymers, say the phenolic resins generally, the same adjuvants possess no efficiency when employed with other classes of polymers, e.g., the polyurethanes, the alkyds, or the cellulose esters. Thus, while one compound is known to be a very good flame-retardant for a polymer and is compatible therewith, the same compound, though it may still confer flame-retardant effect, cannot be used with another polymer owing to incompatibility.

According to the present invention, it has been discovered that the class of organic phosphorus compounds hereinafter disclosed possess the property of efficiently modifying polymeric substances, generally, and that members of this class of phosphorus compounds have the property of favorably affecting more than one characteristic of the polymers. Natural and synthetic polymers, whether linear or cross-linked, are modified by adding the presently useful phosphorus compounds either to the finished polymers or at any stage of the polymerization or condensation process by which the polymers are prepared. The present phosphorus compounds are also advantageously incorporated into the polymers by adding them to the mixtures of monomer reactants to be employed in the polymerization or condensation process and then conducting the reaction.

The invention finds, perhaps, its greatest utility as a flame-retardant for polymeric materials. Thus, as will be hereinafter disclosed, such a diversity of polymeric substances as paper, cotton cloth, the cellulose esters and ethers, polyvinyl chloride, polymethyl methacrylate, phenol aldehyde resins, the polyurethanes, alkyd resins, urea resins, the polycarboxamides of the nylon type, polyacrylonitrile, the linear and cross-linked polyesters, maleic anhydride heteropolymers, styrene-methacrylate copolymers, polymerized olefins and diolefins, are rendered flame-retardant by the present phosphorus compounds. At the same time, depending upon the quantity of the phosphorus compound which is in contact with the polymer, plasticizing or softening effect is obtained. Thus, at say, a 10% to 50% concentration of the phosphorus compound, based on the total of polymer and phosphorus compound, the polymer generally not only is flame-proofed but also plasticized. Use of the present phosphorus compounds at much lower concentrations, say in an amount which in some cases is as low as 0.01% imparts a degree of thermal stability, though better results are generally obtained by using greater amounts for this purpose, say quantities which are about 4–6% or upwards. The present phosphorus compounds may be used with the polymers in a quantity which is equal to that of the polymer, but in most instances favorable results with respect to improvement in heat stability and/or flame retardance and/or plasticity is obtained at concentrations which are definitely lower. It will be evident, of course, that for the preparation of plastisols, quantities of the phosphorus compound which are greater than that of the polymer will be required. Use of the present phosphorus compounds with the polymeric materials in quantities which confer beneficial properties to the polymers with respect to a desired effect, e.g., flexibility in the case of a film, flame-proofing in the case of a foam insulator or thermal stability in the case of extruded fibers or molded pieces, often confers to the polymer an improvement also in such characteristics as resistance to impact, dimensional stability, resistance to scorch in curing, moldability, etc. These varied effects are readily determinable by those skilled in the art simply by visual observation or by use of conventional techniques. Hence in order to arrive at optimum beneficial effect suited to the purposes for which the polymeric composition is designed, only routine testing, involving variation of adjuvant quantity, is generally required, although in some instances one or more members of the whole class of the presently useful phosphorus compounds will be found to impart a degree of modification at a low concentration which can be attained by other members of the class at significantly higher concentrations.

The class of phosphorus compounds which is presently employed with the polymers is characterized particularly by containing 2 or more phosphorus atoms, one of which may be trivalent and at least one of which is bonded to carbon. Although individual members of the whole class will differ from each other in some respects, members of the class generally are desirable adjuvants for high molecular weight polymeric materials. This may be ascribed to the recurrency of the C—P and O—P linkages which is characteristic of the class; however, I cannot, at this time, make claim to any relationship between such structure and effect, nor can I explain the surprisingly broad spectrum of polymeric materials which are beneficially modified by the presently useful compounds.

My invention consists only in the provision of an organic material comprising a polymer selected from the class consisting of natural and synthetic, linear and cross-linked polymers in contact with not more than an equal amount, based on the weight of the polymer, of an adjuvant which is an organic compound of the formula

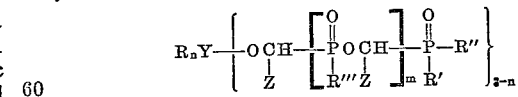

where $n$ is a number of 0 to 2, $m$ is a number of 0 to 100 when $n$ is 2 and 0 when $n$ is less than 2, Y is selected from the class consisting of $=P—$, $=P=O$, $=P=S$, each R is selected from the class consisting of hydrocarbyl, halohydrocarbyl, alkoxyhydrocarbyl, and (hydrocarbyloxy)halohydrocarbyl radicals of from 1 to 12 carbon atoms and such radicals linked to the phosphorus atoms of Y by an element selected from the class consisting of —O—, and —S— and wherein two R's taken together stand for a radical selected from the class —O-hydrocarbylene-O— and —O-halohydrocarbylene-O— radicals which are free of aliphatic unsaturation and which contain from 2 to 10 carbon atoms; R''' is selected from the class consisting of hydrocarbyl, halohydrocarbyl, alkoxyhalohydrocarbyl and hydrocarbyloxyhalohydrocarbyl radicals of from 1 to 12 carbon atoms and such radicals linked to the phosphorus atoms by an element selected from the class consisting of —O— and —S—; Z is selected from the class consisting of hydrogen, hydrocarbyl, halohydrocarbyl, carboalkoxyhydrocarbyl, alkylthiohydrocarbyl, alkoxyhydrocarbyl, and cyanohydrocarbyl radicals of from 1 to 17 carbon atoms when $n$ is 2 and from 1 to 10 carbon atoms when $n$ is less than 2, and the furyl and thienyl radicals; and R' and R'' are selected from the class consisting of alkyl, haloalkyl, aryl, haloaryl, alkoxy, haloalkoxy, and (hydrocarbyloxy)haloalkoxy radicals of from 1 to 12 carbon atoms.

Some of the presently useful phosphorus compounds may be prepared by the reaction of a trivalent phosphorus compound having a halogen atom linked to the phosphorus atom thereof, a carbonyl compound and an ester of a trivalent phosphorus acid, substantially described in my copending application, Serial No. 780,209, filed December 15, 1958, now abandoned, and in the continuation-in-part thereof, application Serial No. 27,505, filed May 9, 1960, which has issued as Patent No. 3,014,944. This reaction proceeds as follows:

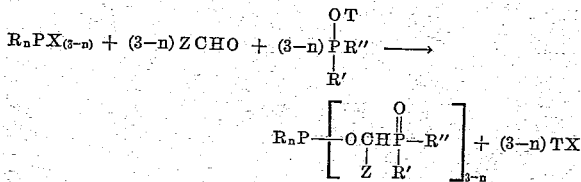

where R, R' and R'', Z and $n$ are as herein defined, X is selected from the class consisting of chlorine and bromine and T is selected from the class consisting of alkyl, haloalkyl and (hydrocarbyloxy)haloalkyl radicals of from 1 to 12 carbon atoms.

The above reaction takes place by using substantially the number of moles of the aldehyde ZCHO and of the trivalent phosphorus ester R'R''POT which is substantially equal to the number of halogen atoms present in the phosphorus-halogen compound $R_nPX_{(3-n)}$. Thus, if the phosphorus-halogen compound is phosphorus trichloride, the product has the formula

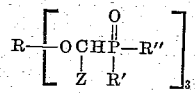

When the phosphorus-halogen compound is, say, a dihalide such as phenyl phosphorodichloridite, the product has the formula

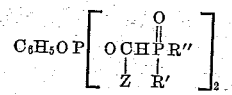

When the phosphorus halogen compound is a monohalide such as 2-chloro-1,3,2-dioxaphospholane, the product has the formula

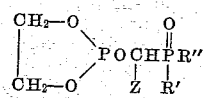

It will be noted that all of the above compounds contain a trivalent phosphorus atom. However, they may be readily converted to compounds having only pentavalent phosphorus atoms by treatment with either an oxodizing or thionating agent, substantially as described in my applications Serial No. 841,443, filed Sept. 22, 1959; Serial No. 841,450, filed Sept. 22, 1959, now Patent No. 3,020,306; Serial No. 844,206, filed Oct. 5, 1959; Serial No. 846,817, filed Oct. 16, 1959; Serial No. 847,684, filed Oct. 21, 1959; Serial No. 852,160, filed Nov. 12, 1959; and Serial No. 852,206, filed Nov. 12, 1959.

The above compounds are thus converted to

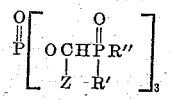

or

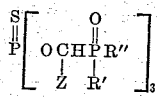

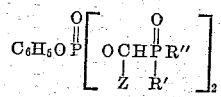

or

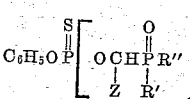

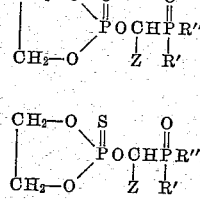

or

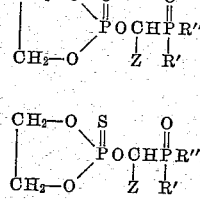

The trivalent phosphorus atom of those compounds which are derived from a bis(haloalkyl) phosphorohalidite or from a haloalkyl phosphonohalidite, an aldehyde and a trivalent phosphorus ester in substantially equimolar amounts can be converted to the pentavalent state by heat rearrangement. For example, bis(2-chloroethyl) phosphorochloridite, acetaldehyde and triethyl phosphite react together to give the bis(2-chloroethyl) phosphite of diethyl 1-hydroxyethylphosphonate which, upon heating, is rearranged as follows:

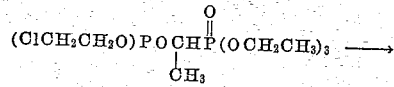

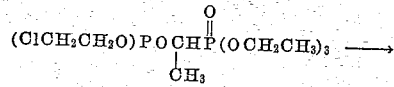

Heat isomerization of the products obtained from a haloalkyl phosphonohalidite, an aldehyde, and a trivalent phosphorus ester proceeds, e.g., as follows:

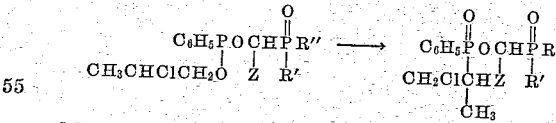

My application Serial No. 828,464, filed July 21, 1959, which has issued as Patent No. 3,014,956, describes preparation of the pentavalent phosphorus compounds by heat isomerization of the haloalkyl trivalent phosphorus esters which takes place substantially according to the theme:

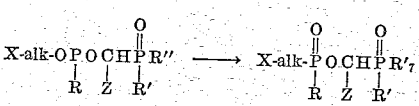

where X is chlorine or bromine and R, R', R'' and Z are as defined above.

It will thus be evident that numerous compounds having one trivalent phosphorus atom and from one to three pentavalent phosphorus atoms are obtained by reacting together a trivalent phosphorus-halogen compound with the number of moles of an aldehyde and a trivalent phosphorus ester which are equal to the number of halogen atoms present in the phosphorus-halogen reactant; that numerous compounds having phosphorus present only in the pentavalent state are obtained by subsequent reaction with oxygen or sulfur whereby addition of the oxygen or sulfur takes place at the trivalent phosphorus atom; and that many compounds having phosphorus present only in the pentavalent form are obtained by heat rearrangement of a haloalkyl trivalent phosphorus ester of an α-hydroxyphosphonate. All of such products can be defined by the general formula:

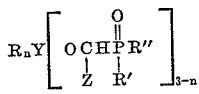

where R, R', R'', Z, Y and $n$ are as defined above. And they are all prepared by intially starting with a quantity of the aldehyde and a quantity of the trivalent phosphorus ester which are substantially equal to the number of halogen atoms present in the phosphorus-halogen compound. The treatment with oxygen or sulfur or the heat treatment are subsequent steps which effect only a portion of the initial molecule, i.e., that which is derived from the phosphorus-halogen compound. Such subsequent treatment provides compounds having improved thermal stability and very good resistance to hydrolysis by water. Hence, for some purposes, those of the compounds which contain phosphorus only in the pentavalent form are particularly useful adjuvants for natural and synthetic fibers.

Some of the initial products, i.e., those containing one trivalent phosphorus atom present as a part of an alkyl or haloalkyl phosphite or phosphonite structure can be converted to still other compounds of present utility. Such initial products, esters of a trivalent phosphorus acid, can react with additional quantities of a mono-halogen phosphorus compound and of an aldehyde; thus when T is an alkyl or haloalkyl radical and R, R', R'' and R''' are as herein defined the following occurs:

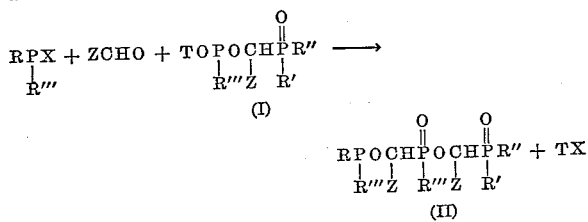

Of course, if in the phosphorus halogen compound at least one of the R's is an alkoxy or haloalkoxy radical, the compound II would have the structure

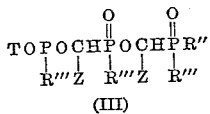

Here again, in (III) there is the alkyl or haloalkyl trivalent phosphorus ester structure required for reaction with a phosphorus halogen compound and an aldehyde; (III) thus reacts as follows:

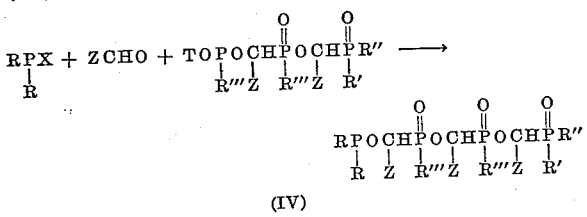

The compound IV obviously has the formula

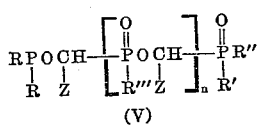

where $n$ is 2. Compd. (III) has the same structure, with $n$ being 1; and in the initial product, i.e., (I), $n$ is zero. Of course, the further reaction of IV will depend upon whether the trivalent phosphorus atom is attached to at least one alkoxy or haloalkoxy radical, since such a radical is required for reaction with a further quantity of phosphorus halogen compound and aldehyde. Bearing this in mind, compounds of the structure (V) wherein $n$ has an increasingly greater value are obtained by prolonged addition of phosphorus halogen compound and aldehyde to intermediately formed products. Reaction ceases when the required quantities of aldehyde and halogen compound are no longer available or whenever there is formed as product a compound which does not possess the required phosphite (TO)$_2$PO— or phosphonite TOP(R)O— structure.

A very convenient method of preparing compounds having the structure V, where $n$ is at least one is described in my copending application Serial No. 820,618, filed June 16, 1959, which has issued as Patent No. 3,014,-954. According to this method, the ratio of trivalent phosphorus ester, aldehyde and trivalent phosphorus halogen compound which are reacted together is such that the aldehyde and halogen compound are present in substantially equimolar proportions and the trivalent phosphorus ester is present in less than an equimolar proportion with respect to the other two reactants. With such a ratio, using as the phosphorus halogen compound an ester of either phosphorochloridic acid or an ester of phosphonochloridic acid, there is first formed the 1:1:1 product:

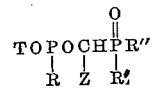

where T is an alkyl or haloalkyl radical of 1–12 carbon atoms. Formation of the 1:1:1 product uses up the originally present trivalent phosphorus ester; and the excess of aldehyde and phosphorus halogen compound reacts with the newly formed trivalent phosphorus ester, i.e., the 1:1:1 product to give products of the formula

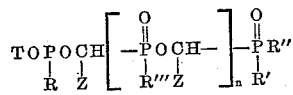

where $n$ is at least 1. The value of $n$ is a function of the quantity of phosphorus halogen compound and of the aldehyde which is available for reaction of intermediately formed products.

A commercially attractive process for preparing mixtures consisting of phosphorus halogen compound and trivalent phosphorus ester, which mixtures can then be reacted with an aldehyde to give the presently useful products, comprises reaction of an oxirane compound with phosphorus trichloride or phosphorus tribromide in certain proportions as disclosed in my copending application, Serial No. 780,262, filed December 15, 1958, which has issued as Patent No. 3,014,951. The reaction of 5 moles of an oxirane compound, e.g., an alkylene oxide or a glycidyl ether, with 2 moles of a phosphorus halide results in the production of an equimolar mixture of phosphorohalidite and phosphite, e.g., with ethylene oxide as the oxirane compound and phosphorus trichloride there is obtained an equimolar mixture of bis(2-chloroethyl) phosphorochloridite and tris(chloroethyl) phosphite. When the oxirane compound is a glycidyl ether, there is obtained an equimolar mixture of a bis(hydrocarbyloxy-halopropyl) phosphorohalidite and tris(hydrocarbyloxy-halopropyl) phosphite; e.g., from phenyl glycidyl ether and phosphorus tribromide in a 5:2 ratio there is obtained an equimolar mixture bis(3-phenoxy-2-bromopropyl) phosphorobromidite and tris(3-phenoxy-2-bromopropyl)

phosphite. Such mixtures are then reacted with an aldehyde to give compounds of the formula

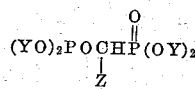

where Y is selected from the class consisting of haloalkyl and hydrocarbyloxyhaloalkyl radicals of from 2 to 12 carbon atoms.

However, when 2 moles of the phosphorus halide is reacted with less than 5 but more than 4 moles of the oxirane compound the phosphorohalidite and the phosphite are not formed in equimolar proportion; instead, the phosphorohalidite is in excess. Thus with 4.8 moles of ethylene oxide and 2 moles of phosphorus trichloride there are obtained 1.5 moles of bis(2-chloroethyl) phosphorochloridite, and with only 4.09 moles of the oxide per mole of the trichloride there are obtained 21 moles of the phosphorochloridite per mole of the phosphite. As disclosed in my copending application Serial No. 820,618, filed December 16, 1958, which has issued as Patent No. 3,014,954, mixtures of phosphorohalidite and phosphite prepared by reaction of 2 moles of phosphorus trichloride or tribromide with less than 5 moles but more than 4 moles of an oxirane compound are particularly useful for preparing those of the presently useful compounds which have a plurality of the units

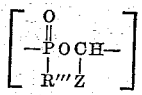

Here the excess of phosphorohalidite with respect to phosphite which is required to produce compounds of this type is conveniently present. Thus when the ratio of phosphorohalidite to phosphite is 21:1, the addition of aldehyde in a quantity which is equimolar with respect to the halidite results in the production of a product having an average of 20 such units, e.g., from ethylene oxide, phosphorus trichloride and propionaldehyde, the following product is obtained:

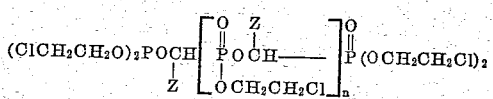

where $n$ has an average value of 20. Because the reaction of each intermediately formed product with the excess of phosphorochloridite and aldehyde proceeds very rapidly, the product obtained is a mixture having varying values for $n$. Hence the value given above, ascertained by the quantity of reactants consumed and by elemental analysis, is necessarily an average value. Actually, the product probably consists of mixtures in which $n$ will vary from, say, 0 to as high as 50, with the average being 20.

Compounds containing a plurality of the units

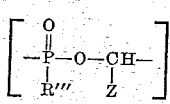

can be oxidized, thionated, or heat isomerized to give products having phosphorus present only in the pentavalent form. Upon reaction with oxygen or sulfur the trivalent phosphorus atom is rendered pentavalent and the products have the formula

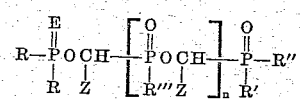

where E is oxygen or sulfur.

The more simple of the present compounds, i.e., those prepared from an equimolar mixture of a diester of phosphorochloridous acid, an aldehyde, and a tribasic phosphite can be named as phosphites of 1-hydroxyalkyl-phosphonate. Thus the 1:1:1 reaction product of bis(2-chloroethyl) phosphorochloridite, butyraldehyde and tris(2-chloroethyl) phosphite, said reaction product having the structure

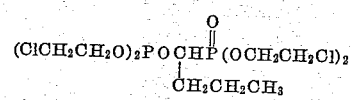

can be named the bis(2-chloroethyl) phosphite of bis(2-chloroethyl) 1-hydroxybutylphosphonate. However, the more complex compounds are more difficultly named and, accordingly, it is believed that understanding of the invention will be best facilitated by simply presenting the structural formula of each compound as reference to it is necessary.

In the simple 1:1:1 reaction product

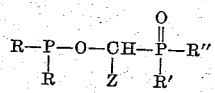

that portion which is derived from the mono-halo phosphorus compound is

That portion which is derived from the aldehyde is

and that portion which is derived from the tribasic trivalent phosphorus ester is

Hence it will be readily evident that a compound of the formula

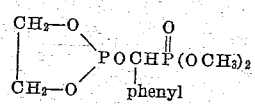

is obtained by the reaction of equimolar quantities of 2-halo-1,3,2-dioxaphospholane, i.e.,

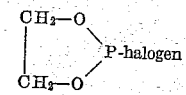

with benzaldehyde and trimethyl phosphite. Likewise it will be easily understood that the compound

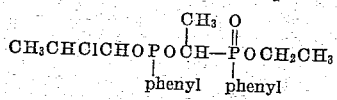

is obtained by the reaction of equimolar quantities of 2-chloropropyl phenylphosphonochloridite

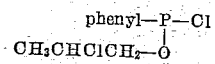

with acetaldehyde and diethyl phenylphosphonite. Similarly in the reaction product obtained with one mole of the mono-halo phosphorus compound with one mole of an aldehyde and less than one more of the tribasic trivalent phosphorus ester,

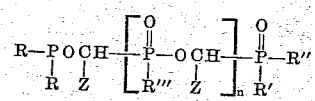

the portion

is derived from the mono-halo phosphorus compound,

is derived from the aldehyde, the portion

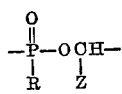

is derived from the same mono-halo phosphorus compound and the same aldehyde and the portion

is derived from the tribasic phosphorus ester. Hence the product

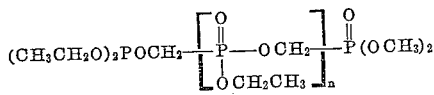

where $n$ is at least 1 is obviously obtained from one mole of the phosphorus-halogen compound $(CH_3CH_2O)_2PX$, where X is chlorine or bromine, one mole of formaldehyde and less than one mole of trimethyl phosphite.

When there are two replaceable halogens in the phosphorus halogen compound, and there are employed with 1 mole of such compound 2 moles of the aldehyde and two moles of the tribasic trivalent phosphorus ester, the product has the formula

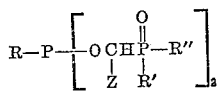

Here the portion R—P= is derived the phosphorus dihalide, $RPX_2$, where X is chlorine and bromine and, as in the instances above, the portion

and

are derived from the aldehyde and the tribasic trivalent phosphite, respectively.

The product obtained from one mole of a phosphorus-halogen compound containing three replaceable halogen atoms and three moles each of the aldehyde and of the tribasic trivalent phosphorus ester has the formula

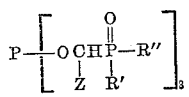

Here the compound was obviously derived from $PX_3$ where X is chlorine or bromine, i.e., phosphorus trichloride or phosphorus tribromide or a mixed phosphorus trihalide having both chlorine and bromine. The portions

and

are derived from the aldehyde and tribasic trivalent phosphorus ester.

As disclosed above, the trivalent phosphorus atom of the above reaction products is readily converted to the pentavalent form by oxidation or thionation. Hence compounds of the formula

and

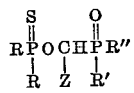

are derived by oxidation or thionation of the compounds

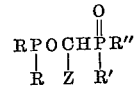

and compounds of the formula

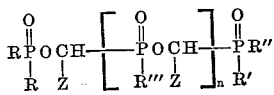

or

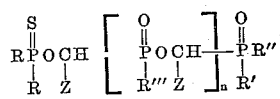

where $n$ is at least 1 are derived by oxidation or thionation of the compounds

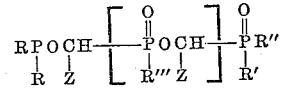

As disclosed above, compounds in which all of the phosphorus is pentavalent are also obtained by heat rearrangement of a product in which at least one R of the portion

is a haloalkoxy radical. Hence the compounds

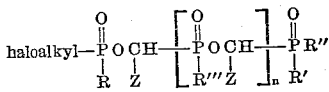

where $n$ is a number of 0 to 100 are obtained either by the oxidation of

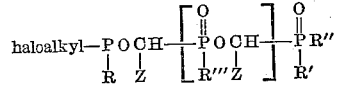

or by the heat rearrangement of

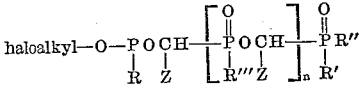

Those of the products which have been obtained by replacement of 2 or 3 halogen atoms of the phosphorus halogen compound, i.e., products of the formula

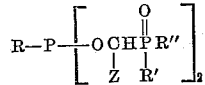

or

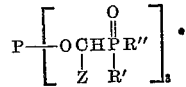

also undergo oxidation or thionation. Hence the compound of the formula

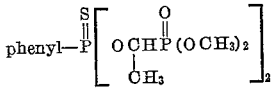

is obviously obtained by thionation of the reaction product of one mole of phenyl phosphonous dichloride or dibromide with two moles each of acetaldehyde and trimethyl phosphite. And the compound of the formula

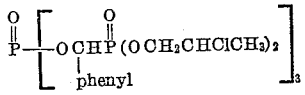

is obviously obtained by oxidation of the product obtained by reacting one mole of phosphorus trichloride or tribromide with three moles each of benzaldehyde and tris(2-chloropropyl) phosphite.

In many of the working examples of the invention which are provided herein, the phosphorus compounds which are employed with the polymeric materials are shown only by structural formula; for convenience the names thereof are not given because of complex nomenclature; and for the sake of brevity the compounds from which they are prepared are not shown in view of the ease with which the starting materials can be ascertained by inspection of the structural formula as summarized above. The methods of preparing the compounds are briefly as follows:

The three reactants, i.e., the phosphorus halogen compound, the aldehyde and the tribasic trivalent phosphorus ester are mixed together in the proportions referred to above, either at ordinary, decreased or increased temperatures. Because, generally, an exothermic reaction occurs, it is usually advisable to contact the reactants with each other in the cold and then to apply heat only if no reaction is evidenced after all three reactants are mixed. After reaction has ceased, which can be noted by lack of change in temperature or in viscosity, the by-product halide and possibly any unreacted original material is removed, e.g., by distillation or extraction. Depending upon the proportion of reactants employed, the residue is the substantially pure product of the structure

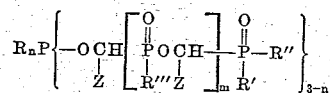

where $n$ is a number of 0 to 2, $m$ is a number of 0 to 100 when $n$ is 2 and 0 when $n$ is less than 2, and R, Z, R' and R'' are as hereinbefore defined. All of such compounds can be oxidized by treatment with an oxidizing agent such as oxygen, ozone, hydrogen peroxide, a hydroperoxide, a nitrogen oxide, or a percarboxylic acid at ordinary or decreased temperatures; and all of such compounds can be thionated by treatment with sulfur at either ordinary temperatures or at tempeartures which may be up to 180° C. The products thus obtained have the formula

where E is oxygen or sulfur.

Also, those of the trivalent phosphorus compounds in which at least one R is a haloalkoxy radical, can be rearranged by heating at a temperature of 135–225° C. to give the compounds

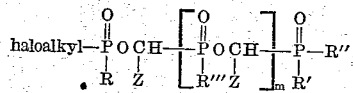

The trivalent phosphorus halogen components which are generally useful for reaction with an aldehyde and a tribasic, trivalent phosphorus ester has the formula

in which $n$ is a number of 0 to 2, X is chlorine and bromine and R is selected from the class consisting of hydrocarbyl, halohydrocarbyl, alkoxyhydrocarbyl, and (hydrocarbyloxy)halohydrocarbyl radicals of from 1 to 12 carbon atoms and such radicals linked to the phosphorus atom of Y by an element selected from the class consisting of —O— and —S— and wherein two R's taken together stand for a radical selected from the class consisting of —O- hydrocarbylene-O— and —O-halohydrocarbylene-O— radicals which are free of aliphatic unsaturation and contain from 2 to 10 carbon atoms. This includes compounds of the following structures, where A denotes a hydrocarbyl radical of from 1 to 12 carbon atoms or said hydrocarbyl radical containing halogen and/or the alkoxy radical as a substituent and X is chlorine or bromine

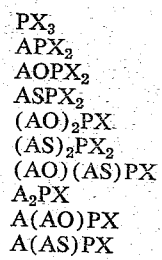

Particularly useful also are the dioxy compounds of the formula

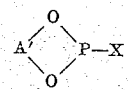

wherein A' is selected from the class consisting of hydrocarbylene radicals of 2 to 10 carbon atoms and halogen-substitution products thereof.

Examples of trivalent phosphorus halogen compounds having the above formulas and useful for the present purposes are, of course, phosphorus trichloride, phosphorus tribromide and mixed phosphorus bromide chlorides insofar as $PX_3$ is concerned.

Compounds of the formula $AOPX_2$ are hydrocarbyl or halohydrocarbyl phosphorodichloridites or dibromidites. The hydrocarbyl radical may be alkyl, alkenyl, alkinyl, cycloalkyl, aryl, alkaryl or aralkyl and such hydrocarbyl radicals may be substituted with one or more atoms of halogen and/or alkoxy radicals. Examples of the phosphorodihalidites are methyl, ethyl, n-propyl, isopropyl, allyl, n-butyl, isobutyl, 2-propinyl, 3-ethoxy-2-chloropropyl, dichlorododecyl 2,4-dichlorocyclopentyl, 2-bromo-2-ethoxylcyclohexyl, 2-fluorocyclopentyl, 2-propoxycyclohexyl, phenyl, α- or β-naphthyl, 4-biphenylyl, benzyl, 2-phenylethyl, 4-isopropylbenzyl, 2-ethoxy-4-chlorobenzyl, or α-naphthylmethyl phosphorodichloridite and phosphorobromidite.

Compounds of the formula $ASPX_2$ are phosphorodihalidothioites. Such compounds are, e.g., ethyl, n-butyl, 2 - ethylhexyl, allyl, pentinyl, 2,4 - dimethylcyclohexyl, 2-fluoroethyl, ethoxyoctyl, bromododecyl, or 4-biphenylyl phosphorodichloridothioite, etc.

The benzenoid phosphorodichloridites or phosphorodichloridothioites may contain one or more halogen and/or alkoxy substituents in either the aromatic ring thereof, at an aliphatic group which is attached to the aromatic ring, or at both the aromatic ring and said aliphatic group. Examples of such halogen-substituted compounds are 2-, 3- or 4-chlorophenyl phosphorodichloridite or phosphorodichloridothioite and 2-chloro-4-methoxybenzyl phosphorodichloridite or phosphorodichloridothioite.

Compounds of the formula $(AO)_2PX$ are dihydrocarbyl or bis(halohydrocarbyl) phosphorochloridites or phosphorobromidites. Such compounds are, e.g., the alkyl, alkenyl, or alkinyl esters such as dimethyl, diethyl, diallyl, diisopropyl, di-2-pentenyl, di-n-hexyl, di-n-heptyl, bis(2-ethylhexyl), di-n-octyl, tert-amyl n-dodecyl, phosphorochloridite, etc., bis(3-chloroallyl), bis(dichlorooctyl), bis(2-fluoroethyl), or 2-chloropropyl ethyl phosphorobromidite.

The corresponding phosphorohalidothioites which are useful for reaction with an aldehyde and a triorgano phosphite to give the presently employed polymer additives are e.g., dimethyl, diethyl, dipentinyl, di-n-butyl, bis(2-chloroethyl), bis(3-fluoropropyl) or 2-propinyl trichlorobutyl phosphorochloridothioite or phosphorobromidothioite.

Also presently useful are the cycloaliphatic esters such as dicyclohexyl, dicyclopentyl, 2,3-dimethylcyclohexenyl n-propyl, or bis(4-chlorocyclohexyl) phosphorochloridite or phosphorochloridothioite.

A class of aromatic trivalent phosphorus halides which are particularly suited for the present purpose are the benzenoid dihydrocarbyl phosphorohalidites, i.e., compounds of the formula

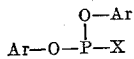

in which Ar is a benzenoid hydrocarbyl radical of from 6 to 12 carbon atoms and X is chlorine or bromine. Such compounds may be diaryl, bis(alkaryl), bis(aralkyl), aryl alkaryl, aryl aralkyl, or alkaryl aralkyl phosphorochloridites, e.g., diphenyl, bis(2-butylphenyl), phenyl α-naphthyl, biphenylyl phenyl, 4-ethylphenyl phenyl, dibenzyl, or amyl biphenylyl phosphorobromidite.

The corresponding benzenoid dihydrocarbyl phosphorohalidodithioites, i.e., compounds of the formula

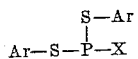

wherein Ar is as defined above, are similarly valuable for the present purpose. Such compounds are, for example, diphenyl phosphorochloridodithioite, p-tolyl 2-phenylethyl phosphorochloridodithioite, etc.

An example of a mixed aliphatic-aromatic ester of present utility is n-butyl phenyl phosphorochloridothioite. Other examples of mixed esters which may be used are methyl phenyl phosphorochloridite, 2-ethyl-hexyl 2,3-dichlorophenyl phosphorochloridite, etc.

Presently useful trivalent phosphorus halides also include the O-hydrocarbyl S-hydrocarbyl phosphorochloridothioites, i.e., compounds of the formula

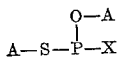

wherein A and X are as above described. Such compounds are, for example, O,S-diphenyl, or O-n-butyl S-p-cumyl phosphorochloridothioites or phosphorobromidothioites.

A very valuable class of the presently useful halides includes the dihydrocarbylphosphinous halides, i.e., compounds of the formula $$A_2PX$$

wherein A and X are as above defined. Such compounds are, e.g., diethylphosphinous bromide, di-2-butenylphosphinous chloride, bis(4-pentylphenyl)phosphinous chloride, (dodecyl)phenylphosphinous bromide, etc.

Also useful in the reaction with aldehydes and triorgano phosphites are the hydrocarbyl hydrocarbylphosphonohalidites and phosphonohalidothioites, i.e., compounds of the formula

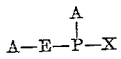

wherein A and X are as above defined and E denotes —O— or —S—. Examples of such compounds are methyl, ethyl, 2-pentenyl, n-octyl, or biphenylyl phenylphosphonochloridite or ethylphosphonochloridite, phenyl or ethyl phenylphosphonochloridothioite, etc.

The above dihydrocarbyl phosphorochloridites, dihydrocarbyl hydrocarbylphosphorochloridodithioites, O-hydrocarbyl S-hydrocarbyl phosphorochloridothioites, dihydrocarbylphosphinous chlorides, hydrocarbyl hydrocarbylphosphonochloridites and hydrocarbyl hydrocarbylphosphonochloridothioites may contain one or more halogen substituents in either an alkyl ring, an aryl radical, at an aliphatic group which is attached to an aromatic ring thereof, or at both the aromatic ring and at said aliphatic group.

Another class of trivalent phosphorus halides which are presently useful are the hydrocarbylphosphonous dihalides of the formula APX$_2$ wherein A is a hydrocarbyl or halohydrocarbyl radical of from 1 to 12 carbon atoms and X is halogen or bromine. Examples of such dihalides are phenylphosphonous dichloride, 2-, 3- or 4-chlorophenylphosphonous dichloride, isopropyl-, n-butyl-, tert-butyl-, 2-butinyl-, trichlorobutyl-, and tert-dodecyl-phosphonous dichloride; o-, m-, or p-tolylphosphonous dichloride, cyclopentylphosphonous dichloride, etc.

Of pronounced utility are cyclic esters of phosphorohalidous acid. Such esters have the formula

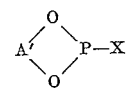

wherein A' is an alkylene or arylene radical having from 2 to 10 carbon atoms. Examples of compounds of the above formula are the various halo dioxaphospholanes, dioxaphosphorinanes, and dioxaphosphepanes, e.g., 2-chloro- or 2-bromo-1,3,2-dioxaphospholane; 2-chloro-4-chloromethyl-1,3,2-dioxaphospholane; 2,5-dichloro-1,3,2-dioxaphosphorinane; 2,6,7-trichloro-1,3,2-benzodioxaphosphole; 2,5-dibromo-1,3,2-dioxaphosphorinane; 2-chloro-5-fluoro-1,3,2-dioxaphosphorinane, etc.

Any of the above described phosphorus-halogen compounds can be reacted with an aldehyde and a triorgano phosphite to give di- or poly-phosphorus compounds which are useful per se as polymer adjuvants or which may be oxidized, sulfurized or heat-arranged to give presently useful compounds.

The useful aldehydes have the formula ZCHO wherein Z is selected from the class consisting of hydrogen and hydrocarbyl, halohydrocarbyl, carboalkoxyhydrocarbyl, alkylthiohydrocarbyl, alkoxyhydrocarbyl and cyanohydrocarbyl radicals of from 1 to 12 carbon atoms, and the thienyl and furyl radicals.

Owing to their easy availability, a particularly useful class of aldehydes includes the aliphatic hydrocarbon aldehydes of from 1 to 18 carbon atoms, e.g., formaldehyde, acetaldehyde, acrolein, propionaldehyde, butyraldehyde, isobutyraldehyde, crotonaldehyde, valeraldehyde, isovaleraldehyde, hexanal, citronellol, heptanal, tiglic aldehyde, 2-ethylhexanal, octanal, 2-butyloctanal, propargaldehyde, 6-methylheptanal, amylpropiolic aldehyde, decanal, undecanal, 2-methylundecanal, lauraldehyde, stearaldehyde, tridecaldehyde, etc.

The presence of cyano, halogen, alkyl, carboalkoxy, alkoxy and alkylthio-substituents in the aliphatic aldehyde has no effect on the course of the reaction; hence, there may be employed such substituted fatty aldehydes as 3-cyanopropionaldehyde, chloroacetaldehyde, 3-butoxybutyraldehyde, ethyl 4-formylbutyrate, diethyl formylsuccinate, iodoacetaldehyde, dichloroacetaldehyde, etc.

Presently useful alicyclic carboxaldehydes include cyclohexanecarboxaldehyde, 6-methyl-3-cyclohexenecarboxaldehyde, 4-chlorocyclohexanecarboxaldehyde, etc. The heterocyclic aldehydes include furfural and the thiophenecarboxaldehydes.

The presently useful benzenoid aldehydes may be aliphatic-aromatic or purely aromatic aldehydes which may or may not be further substituted, e.g., benzaldehyde, o-, m- or p-tolualdehyde, phenylacetaldehyde, dipentylbenzaldehyde, cinnamaldehyde, 4'-formylbenzaldehyde, phenylpropargaldehyde, 2-, 3- or 4-butoxybenzaldehyde, o-, m- or p-chlorobenzaldehyde, p-(ethoxy)benzaldehyde, 2-ethoxybenzaldehyde, 3,4-dipropoxybenzaldehyde, 4-(n-butylthio)benzaldehyde, 4'-bromo-4-biphenylcarboxaldehyde, etc.

Triorgano phosphites which are generally useful with the aldehyde and the phosphorus halide to give the presently useful esters may be simple or mixed phosphites. Examples of useful phosphites are trimethyl, triethyl, triallyl, triisopropyl, tri-n-propyl, tri-2-butenyl, tri-n-butyl, tri-tert-amyl, tri-n-hexyl, tri-n-heptyl, tris(2-ethylhexyl), trioctenyl, tri-n-octyl, trinonyl, tridecyl, triundecyl, tritert-dodecyl, 2-chloroethyl methyl propyl, tris(2,3-dichloropropyl), tris(2 - bromo - 3 - chloropropyl), tris(2-chloro-3-methoxypropyl) and tris(2-bromo-4-phenoxybutyl) phosphite.

Instead of the tribasic phosphites there may be employed as the trivalent phosphorus ester component a diester of a hydrocarbyl or halohydrocarbylphosphonite, e.g., a compound of the formula hydrocarbyl-P(O-alkyl)$_2$ or those in which either the hydrocarbyl or the alkyl radical or both contain halogen and/or the alkoxy radical as substituents. Presently useful phosphonites include, e.g., dimethyl phenylphosphonite, diethyl 2 - propinylphosphonite, ethyl methyl phenylphosphonite, di-n-propyl methylphosphonite, di-n-butyl benzylphosphonite, bis(2-chloroethyl) p - tolyphosphonite, bis(2 - methoxyethyl) cyclohexylphosphonite, allyl propyl 2,4-dichlorophenylphosphonite, bis(trichlorooctyl) cyclohexylphosphonite, bis(4-fluorobutyl) 2 - cyclohexenylphosphonite, bis(4-chlorobutyl) ethylphosphonite, bis(dischlorohexyl) phenylphosphonite bis(2-chloropropyl) n-butylphosphonite, di-n-butyl pentachlorophenylphosphonite, etc.

Presently useful also as the triorgano phosphorus ester component are phosphinites of the (hydrocarbyl)$_2$PO-alkyl or those in which either the hydrocarbyl or the alkyl radicals of both contain halogen and/or the alkoxy radical as substituents, e.g., allyl, butyl, or n-octyl diethylphosphinite or diphenylphosphinite, 4-methoxybutyl or 3-phenoxy-2-chloropropyl di-n-butylphosphinite or di-β-naphthylphosphinite; and the corresponding esters of the halo-substituted phosphinic acids such as the methyl, pentyl, ethyl, 2-butenyl, 2-chloroethyl, 3-ethoxypropyl, or 4-butoxy-2-bromopentyl esters of bis(4-chlorophenyl) phosphinite or of n-butyl(4-chlorophenyl) phosphinite.

Reaction of any of the above phosphorus-halogen compounds with any of the aldehydes and any of the triorgano trivalent phosphorus compounds gives products which are useful per se as adjuvants for polymeric materials generally, and such products may be further reacted with oxygen or sulfur or heat rearranged to give compounds containing phosphorus in only the pentavalent state and hence particularly suitable for numerous polymer applications.

As hereinbefore disclosed, the polymeric materials which are modified by the present phosphorus compounds are natural and synthetic, linear and cross-linked polymers.

Fibrous cellulosic products are prime examples of the natural polymeric materials which are advantageously modified by the present phosphorus compounds. This includes products made of cotton, linen, regenerated cellulose, kapok, hemp, wood and wood pulp, e.g., textiles, twines, paper, cardboard, pressed board, batting wood flour, sawdust, etc. Another group of natural polymers of carbohydrate origin includes the starches such as those derived from corn, barley, potato and cassava. Another class of natural polymers with which the present phosphorus compounds are beneficially used are the natural gums, e.g., agar, gum arabic, psyllium seed, tragacanth and gum karaya. Natural rubber is also included. Natural resins modified by the present phosphorus compounds include shellac, copal, damar, pine balsam, rosin, etc. Proteinaceous polymeric materials, e.g., animal glue, casein, wool, and leather are also advantageously modified by said phosphorus compounds. The natural polymeric products, generally, are rendered flame-retardant when contacted with the present phosphorus compounds in appropriate proportions, and worthy of special comment is the glow proofing of readily ignitible dusts and powders prepared from the natural polymers. Plasticizing effect is conferred by the present phosphorus compounds to those of the polymers which lack the degrees of softness and flexibility that are required in the application for which the polymers are destined. When cotton fibers or textiles are treated with the phosphorus compounds, there is not only flame-retardant effect but also an improvement in the "hand" or feel of the fabric. In many instances, stability to light and heat is imparted to the natural polymers when the phosphorus compounds are used therewith in quantities which are too low to confer significant plasticizing or flame retarding effect, e.g., in quantities which are of the order of, say, from 0.1% to 5% by weight of the polymeric material.

Synthetic polymeric materials, i.e., those high molecular weight materials which are not found in nature, with which the present phosphorus compounds are advantageously employed may be either linear or cross-linked polymers and they may be either those which are produced by addition polymerization or by condensation.

An important class of polymers which are beneficially modified according to the invention are those obtained from a polymerizable monomer compound having ethylenic unsaturation. Such monomers have the general formula $>C=C<$, wherein the ethylenic group is substituted by a member of the group consisting of hydrogen, halogen, alkyl, aryl, aralkyl, alkaryl, alkenyl, alkinyl, cycloalkyl, haloalkyl, haloaryl, haloaralkyl, haloalkaryl, haloalkenyl, haloalkinyl, nitroalkyl, nitroaryl, nitroaralkyl, nitroalkaryl, nitroalkenyl, alkoxyalkyl, alkenyloxyalkyl, carboalkoxy, cyano, amido, dialkylamino, aldehydo, acyl, pryidyl, thienyl, furanyl, pyranyl, tetrahydrofuranyl, quinonyl, and higher heterocyclic groups. Specific examples of the above radicals are methyl, ethyl, propyl, butyl, phenyl, tolyl, xylyl, 4-ethylphenyl, benzyl, 2-phenylethyl, vinyl, propenyl, butenyl, ethinyl, propinyl, butinyl, cyclopentyl, 2-methylcyclopentyl, cyclohexyl, chloro, fluoro, bromo, iodo, 2-chloroethyl, chlorovinyl, 1,2-chloroethyl, 2-chlorophenyl, 2-(4-chlorophenyl)ethyl, 4-bromobenzyl, 3-chloropropinyl, 3-nitropropyl, 4-nitrophenyl, 2 - nitrobenzyl, nitrovinyl, ethoxy, methoxyethyl, vinyloxy, allyloxy, carbomethoxy, carboethoxy, acetyl, propionyl, cyano, formyl, acetoxy, propionoxy, carboxy, amido, furyl, carbazyl, indolyl, pyrrolyl, pyrrolidinyl, piperidinyl, diethylaminoethyl, and dimethylamido.

A particularly preferred class consists of the polymerized vinyl and vinylidene compounds i.e., those having the $CH_2=C<$ radical. Compounds having such a radical are, e.g., the solid polymeric alkenes, such as polyethylene, polypropylene, polyiso-butylene or ethylene-propylene copolymer; polymerized acrylyl and alkacrylyl compounds such as acrylic, chloroacrylic and methacrylic acids, anhydrides, esters, nitriles and amides, for example, acrylonitrile, ethyl or butyl acrylate, methyl or ethyl methacrylate, methoxymethyl or 2(2-butoxyethoxy)ethyl methacrylate, 2(cyanoethoxy)ethyl 3-(3-cyanopropoxy) propyl acrylate or methacrylate, 2-(diethylamino)-ethyl or 2-chloroethyl acrylate or methacrylate, acrylic anhydride or methacrylic anhydride; methacrylamide or chloroacrylamide, ethyl or butyl chloroacrylate; the olefinic aldehydes such as acrolein, methacrolein and their acetals; the vinyl and vinylidene halides such as vinyl chloride, vinyl fluoride, vinylidene fluoride and 1-chloro-1-fluoroethylene, polyvinyl alcohol; the vinyl carboxylates such as vinyl acetate, vinyl chloroacetate, vinyl propionate, and vinyl 2-ethylhexanoate; the N-vinyl imides such as N-vinylphthalimide and N-vinylsuccinimide; the N-vinyllactams such as N-vinylcaprolactam and N-vinylbutyrolactam; the vinyl aromatic hydrocarbon compounds such as styrene, α-methylstyrene, 2,4-dichlorostyrene, α- or β-vinylnaphthalene, divinylbenzene and vinylfluorene; the vinyl ethers such as ethyl vinyl ether or isobutyl vinyl ether; vinyl-substituted heterocyclic compounds such as vinylpyridine, vinylpyrrolidone, vinylfuran or vinylthiophene; the vinyl or vinylidene ketones such as methyl vinyl ketone or isopropenyl ethyl ketone; vinylidene cyanide; etc. Homopolymers of the above compounds or copolymers or terpolymers thereof are beneficially modified by the present phosphorous compounds.

Other presently employed polymers of compounds having the ethylenic group, >C=C<, are the homopolymers, copolymers and terpolymers of the α,β-olefinic dicarboxylic acids and the derivatives thereof such as the anhydrides, esters, amides, nitriles and imides, e.g. methyl, butyl, 2-ethylhexyl or dodecyl fumarate or maleate, maleic, chloromaleic, citraconic or itaconic anhydride, fumaronitrile, dichlorofumaronitrile or citracononitrile, fumaramide, or maleamide; maleimide or N-phenylmaleimide, etc. Examples of particularly useful copolymers and terpolymers prepared from the α,β-olefinic dicarboxy compounds are the copolymers of maelic anhydride and a vinyl compound such as ethylene, propylene, isobutylene, sytrene, α-methylstyrene, vinyl acetate, vinyl propionate, methyl isopropenyl ketone, isobutyl vinyl ether, etc., the copolymers of dialkyl fumarate such as ethyl or butyl fumarate and a vinyl compound such as styrene, vinyl acetate, vinylidene chloride, ethyl methacrylate, acrylonitrile, etc.

Readily and advantageously modified by the present phosphorous compounds are also the polymers and copolymers of unsaturated, cyclic esters of carbonic acid, e.g., homopolymeric vinylene carbonate or the copolymers of vinylene carbonate with ethylenic compounds such as ethylene, vinyl chloride, vinyl acetate, 1,3-butadiene, acrylonitrile, methacrylonitrile, or the esters of methacrylic or acrylic acid.

Advantageously modified by the present phosphorous compounds are also polymers, copolymers or terpolymers or polymerizable compounds having a plurality of double bonds, e.g., a rubbery, conjugated diene polymerizate such as homopolymerized 2,3-butadiene, 2-chlorobutadiene or isoprene and linear copolymers or terpolymers such as butadiene-acrylonitrile copolymer, isobutylene-butadiene copolymer (butyl rubber) butadiene-styrene copolymer or 2-chlorobutadiene-vinylidene cyanide-acrylonitrile terpolymer; esters of saturated di- or polyhydroxy compounds with olefinic carboxylic acids such as ethylene glycol dimethacrylate, triethylene glycol dicrotonate or glyceryl triacrylate; esters of olefinic alcohols with dicarboxylic acids or with olefinic monocarboxylic acids such as diallyl adipate, divinyl succinate, diallyl fumarate, allyl methacrylate or crotyl acrylate and other di-ethylenically unsaturated compounds such as diallyl carbonate, divinyl ether or divinylbenzene, as well as the cross-linked polymeric materials such as methyl methacrylate-diallyl methacrylate copolymer or butadiene-styrene-divinylbenzene terpolymer.

Polymerized materials prepared by subsequent reaction of preformed vinyl polymers, e.g., polvinyl alcohol, the polyvinyl acetals such as polyvinyl formal or polyvinyl butyral, or completely or partially hydrolized polyacrylonitrile, are likewise modified in properties by the present phosphorous compounds to give polymeric materials of enhanced utility.

Homopolymers and copolymers of the following polymerizable heterocyclic compounds are also advantageously modified by the present phosphorus compounds: vinylpyridine, vinylfuran, vinyldibenzofuran, N-vinylcarbazole.

Polymeric materials with which the present phosphorus compounds can be employed as adjuvants are also polymers which contain elements such as sulfur, phosphorus, boron or silicon, e.g., the sulfides, sulfones, sulfoxides, sulfites, sulfates and sulfonates such as the polymers and copolymers of vinyl sulfide, vinyl sulfone, 2-propenyl sulfoxide, ethylenesulfonic acid and its salts, esters and amides, and sulfonated polystyrene; the olefin-sulfur dioxide polymers, the phosphines, phosphites, phosphates and phosphonates such as diphenylvinylphosphine, allyl phosphite and metallyl phosphite, ethylenephosphonic acid and styrenephosphonic acids and their salts, esters and amides; the silanes such as dimethylvinylsilane, diphenylvinylsilane and methylphenylvinylsilane, etc.

A class of synthetic polymeric materials with which the present phosphorus compounds are very useful comprises the cellulose derivatives, e.g., the cellulose ester such as cellulose acetate, cellulose triacetate, or celluose acetate butyrate, the cellulose ethers such as methyl or ethyl cellulose, cellulose nitrate, carboxymethyl cellulose, cellophane, rayon, regenerated rayon, etc. The phosphorus compounds may be incorporated into films of such cellulose derivatives by adding them to the solutions from which the films are cast or into the melts from which the fibers are extruded.

The present phosphorus compounds are particularly suited to the modification of liquid resin compositions of the polyester type. Such resins are well adapted in structural fabrications, particularly in the manufacture of reinforced fibrous structures, e.g., glass or cellulosic fibers. However, their usefulness in such applications has been hampered by considerations of the fire hazard which stems from their combustibility. It has been found, according to the invention, that the present phosphorus compounds are flame retardants for the polyester resins, and that they impart the flame retardant property at concentrations which do not sacrifice of transparency or flexibility. The present compounds are compatible with the polyesters in proportions which not only impart fireproofing properties to the resins but also serve as softening and plasticizing agents. Polyester resins with which the present phosphorus compounds are useful are either the linear polyesters which are obtained by the reaction of one or more polyhydric alcohols with one or more α,β-unsaturated polycarboxylic acids alone or in combination with one or more saturated polycarboxylic acid compounds, or the crosslinked polyester resins which are obtained by reacting the linear polyester with a compound containing a $CH_2=C<$ group.

Polyhydric alcohols which are used for the preparation of the presently modified polyester resin are, e.g., ethylene glycol, diethylene glycol, propylene glycol, trimethylene glycol, trimethylolpropane, trimethylolethane, 1,4-butanediol, 4,4'-isopropylidenediphenol, 4,4'-isoproplidenedicyclohexanol, hydroquinone, 1,2-dihydroxynaphthalene, 4,4'-dihydroxybiphenyl, 4,4'-(2-butylidene)-di-m-cresol, glycerol, pentaerythritol, mannitol, etc.

The polycarboxylic acid compounds used in preparing the presently modified polyester resins are, e.g., the α,β-unsaturated acids or the anhydrides or acyl halides thereof, such as maleic acid, maleic anhydride, maleyl chloride, fumaric acid, itaconic acid, itaconoyl chloride, mesaconic acid, citraconic acid, etc.; the alkanedicarboxylic acids, anhydrides or acyl halides thereof such as oxalic or malonic acid, anhydride or acyl halide, succinic acid, anhydride or halide; adipic acid, acyl halide or anhydride and sebacic acid, acyl halide or anhydride; the cycloparaffindicarboxylic acids such as 1,2-cyclohexanedicarboxylic acid or its anhydride or acyl halide; the aromatic dicarboxylic acids such as phthalic, terephthalic or 1,2-naphthalenedicarboxylic acid or the anhydrides or acyl halides thereof, the halogenated dicarboxylic compounds such as dichloroterephthalic acid or 1,4,5,6,7,7-hexachlorobicyclo-(2,2,1)-5-heptene-2,3-dicarboxylic anhydride, etc.

The cross-linking component of the present modified polyester resin may be any compound containng the group $CH_2=C<$ and having a boiling point of at least 60° C. Among the numerous compounds which are employed for this purpose may be mentioned styrene, ethyl acrylate, methyl methacrylate, acrylonitrile, methacrylonitrile, vinyl acetate, vinyl chloroacetate, isopropenyl methyl ketones, isobutylene, vinyl isobutyl ether, N-vinylpyrrole, acrolein, 3-butenyl acetate, etc.

The present phosphorus compounds may be added to the polyester compositions at any stage of processing. For preparation of casting and laminating resins, a recommended procedure is to first prepare a resin syrup by reacting the polyhydric alcohol component with the polycarboxylic acid component and then to add the phosphorus compound to a mixture of the resin syrup and the cross-linking agent i.e., the vinyl or vinylidene compound, previous to curing. This latter step is generally effected in the presence of a catalyst for polymerization, e.g., benzoyl peroxide, ethyl methyl ketone peroxide or tert-butyl hydroperoxide, and with optional use of additives such as mold lubricants, reinforcing agents, pigments, etc. Use of the present phosphorus compounds in amounts of, say, 5% to 25%, based on the weight of the polyester, has been found to impart flame retardant properties to the polyester resins, and when the phosphorus compound is employed in greater proportion, say, up to an equal amount by weight of the polyester, there is also evidenced very good plasticizing effect. At very low concentrations, say at concentrations of up to 5%, based on the weight of the polyester, increase in thermal stability and decrease in light sensitivity are noted.

The present phosphorus compounds are useful for modifying either the cast polyester resins or fibers and foams prepared from polyester resins. The compounds are preferably incorporated into the reactant mixture previous to esterification reaction or they may be added to the ejection mix as in the case of fiber manufacture or to the foam mix prior to hardening. Good results can be obtained, however, by application of the phosphorus compounds to the finished fibers or foams, e.g., by immersing or spraying the polyester, fibers or textiles prepared therefrom in or with solutions of the phosphorus compounds or by similar treatment of the polyester foams.

The present phosphorus compounds are also valuable adjuvants for film-forming polyesters which may or may not be modified with drying or semi-drying fatty oils or terpenic compounds. These types of polyesters, commonly known as alkyd resins, are plasticized by the phosphorus compounds. The resins may be preformed before contacting with the present adjuvant or the phosphorus compound may be incorporated into the resin by adding the compound to the mixture of polyhydric alcohol, polycarboxylic acid and/or oil or terpenic compound before the resinifying esterification reaction is effected.

The epoxy resins are another class of polymeric materials with which the present compounds are compatible and are advantageously used. These resins are condensation products formed by the reaction of a polyhydroxy compound and epichlorohydrin, which condensation products are subsequently cured by addition of cross-linking agents. The hydroxy compound may be any of the polyhydric compounds mentioned above as useful for the preparation of polyester resins; bisphenol, i.e., 4,4'-isopropylidenediphenol, is the commonly employed polyhydric compound. The cross-linking agent employed in the curing or hardening step may be a dicarboxylic compound such as phthalic anhydride or adipic acid, but is more generally a polyamine such as ethylene diamine, m- or p-phenylene diamine or, diethylenetriamine. The present phosphorus compounds are advantageously added to the linear condensation product of the epichlorohydrin and the polyhydric compound, together with the cross-linking agent, previous to curing or hardening. The resulting mixture is then cast into molds or it may be used for the manufacture of laminates, as bonding adhesive, and for the production of hard foams. For the latter use, the mixture of linear condensation product, phosphorus compound and cross-linking agent is cured in the presence of blowing agents. The hardened products, whether molded casts, laminates, or foams are characterized by possessing flame retardant properties and good dimensional stability.

The polyurethanes comprise another class of polymeric materials which are beneficially modified by the present phosphorus compounds. The polyurethanes, like the above mentioned polyesters, are commercial materials which are employed in structural applications e.g., as insulating foams, in the manufacture of textile fibers, as resins bases in the manufacture of curable coating compositions and as impregnating adhesives in the fabrication of laminates of woods and other fibrous materials. Essentially the polyurethanes are condensation products of a diisocyanate and a compound having a molecular weight of at least 500 and preferably about 1500–5000, and at least two reactive hydrogen atoms, i.e., hydrogen atoms determinable by the Zerewitinoff method. The useful active-hydrogen containing compounds may be polyesters prepared from polycarboxylic acids and polyhydric alcohols, polyhydric polyalkylene esters having at least 2 hydroxyl groups, polythioether glycols, polyesteramides, etc.

The polyesters used for the production of the polyurethane may be branched and/or linear. Thus, the useful polyesters and/or polyesteramides may include those obtained by condensing any polybasic (preferably dibasic carboxylic) organic acid, such as adipic, sebacic, 6-aminocaproic, phthalic, isophthalic, terephthalic, oxalic, malonic, succinic, maleic, cyclohexane-1,2-dicarboxylic, cyclohexane-1,4-dicarboxylic, polyacrylic, naphthalene-1,2-dicarboxylic, fumaric, itaconic, etc., with polyalcohols such as ethylene glycol, diethylene glycol, pentaglycol, glycerol, sorbitol, triethanolamine, di-($\beta$-hydroxyethyl) ether, etc. and/or amino-alcohols such as ethanolamine.

The alkylene glycols and polyoxyalkylene or polythioalkylene glycols used for the production of the polyurethanes may comprise ethylene glycol, propylene glycol, butylene glycol-2,3, butylene glycol-1,3, 2-methylpentanediol-2,4, 2-ethylhexanediol-1,3, hexamethylene glycol, styrene glycol and decamethylene glycol, etc.

The organic polyisocyanates useful for the production of the polyurethanes include ethylene diisocyanate, ethylidene diisocyanate, propylene-1,2-diisocyanate, butylene-1,3-diisocyanate, hexylene-1,6-diisocyanate, cyclohexylene-1,2-diisocyanate, m-phenylene diisocyanate, 2,4-toluylene diisocyanate, 1,6-toluylene diisocyanate, 3,3'-dimethyl-4,4'-biphenylene diisocyanate, 3,3'-dimethoxy-4,4'-biphenylene diisocyanate, 3,3'-diphenyl-4,4'-biphenylene diisocyanate, 4,4'-biphenylene diisocyanate, and 1,5-naphthalene diisocyanate, etc.

In practice, the polyurethane plastics are produced by bringing together the organic compound which contains at least 2 reactive hydrogen atoms and is capable of forming polyurethanes, with the polyisocyanate and an activator mixture. The latter is made up of at least one cross-linking agent and/or an accelerator and may contain, if desired, added water or an aqueous solution. The addition of such an activator mixture to the mixture of polyisocyanates and active hydrogen compound initiates the cross-linking action needed to obtain homogeneous plastics or the cross-linking and foaming action necessary to obtain foam plastics. Useful cross-linking agents include water or aqueous solutions for foamed plastics and the polyalcohols, such as ethylene glycol, glycerol, etc. for non-porous plastics; and useful accelerators include the tertiary amines.

For preparation of the flame-retardant polyurethanes, the present phosphorus compounds are preferably added to a prepolymer prepared from the active hydrogen compound and the diisocyanate previous to or simultaneously with the activator mixture, i.e., before hardening. The hardened molded pieces or foams are rendered flame retardant by the inclusion therein of the present phosphorus compounds in quantities of, say, from 5% to 25% by weight of the polyurethane. Simultaneous plasticizing property is evidenced and continues to be demonstrated until the quantity of phosphorus compound is substantially equal to that of the polyurethane. Use of the phosphorous compounds in the polyurethane foams can also increase flexibility and, in some applications, improve the mechanical properties of the foams.

Phenolic resins are also beneficially modified by the present phosphorus compounds, which compounds are incorporated into the resin either by milling in molding applications or by addition to film-forming or impregnating and bonding solutions previous to casting. Phenolic resins with which the present compounds are employed are, for example, the phenol-aldehyde resins prepared from phenols such as phenol, cresol, xylenol, resorcinol, 4-butylphenol, 4-phenylphenol, and aldehydes such as formaldehyde, acetaldehyde, or butyraldehyde in the presence of either acidic or basic catalysts, depending upon whether the resin is intended for use as a molding or extruding resin or as the resin base in coating and impregnating compositions. When destined for use as molding resins the phenol is generally condensed with the aldehyde in the presence of alkali, and the present phosphorus compound is added to the resulting liquid resin previous to the curing stage. When the phosphorus compound is used in greater proportions, say in proportions of from 10 to 30% by weight of the resins, significant flame retardant properties are evidenced, which properties are accompanied by plasticizing effect. In higher ratios these effects are preserved, although the higher proportions of phosphorus compounds are not particularly recommended owing to economical considerations.

The aminoplasts comprise another group of aldehyde resins which are beneficially modified by the present phosphorus compounds. Examples of the aminoplasts which are modified according to the invention are the heat-convertible condensation products of an aldehyde with urea, thiourea guanidine, cyanamide, dicyandiamide, alkyl or aryl guanamines, and the triazines such as melamine, 2-chloro-4,6-diamino-1,3,5-triazine and 2-hydroxy-4,6-diamino, 1,3,5-triazines. The aminoplasts may be prepared by using various aldehydes instead of formaldehyde; e.g., there may be used acetaldehyde, propionaldehyde, furfural, glyoxal and the like.

The present adjuvants are compatible with the aminoplasts; and depending upon the quantity of phosphorus compound used, they serve to plasticize them, and to render them fire-retardant. When the aminoplasts are destined for use as impregnating agents, bonding adhesives, coatings and casting of films, the phosphorus compounds are incorporated into solutions or suspensions in which the aminoplast is carried. The resulting mixtures give strong, fire-retardant laminates when sheets of paper, glass cloth or fabric are impregnated therewith and cured. Textile fabrics or papers to which the liquid mixtures are applied by padding or spraying are not only made fire-retardant but also rendered pliable and shrink-proof. Wet strength is increased. In molding applications, the phosphorus compound is compounded with the resin together with the customary dyes or pigments and fillers, e.g., cellulose, asbestos, wood flour, glass fibers, chopped cotton fabric.

Also beneficially modified by the present phosphorus compounds are the nylons, i.e., the superpolyamides which are generally obtained by the condensation of a diamine, e.g., hexamethylenediamine with a dicarboxylic acid, e.g., adipic acid. Depending upon the quantity of phosphorus compound employed and the individual nature of the compound, there are obtained flame-retardant, dye receptor, and/or plasticizing effects.

Other polyamides with which the present phosphorus compounds are beneficially employed, e.g., for improvement in thermal stability, are the polypeptides which may be prepared, e.g., by the condensation reaction of an N-carboalkoxy substituted or an N-acyl substituted α-amino carboxylic acid with the same or different unsubstituted amino carboxylic acid, e.g., by reaction of N-carbobenzyl oxyglycin with glycine or a mixture of glycine and lysine, or an N-carboxy amino acid anhydride such as N-carboxy-DL-phenylalanine anhydride.

Still another class of polyamides which are beneficially modified according to the invention are the polymeric lactams, e.g., polycaprolactam, piperidone, 2-oxohexamethyleneimine and other cyclic amides. The present phosphorus compounds can be incorporated into molding or extruding compositions for plasticizing and flame-retardant effect and/or to serve as mold lubricants.

The present phosphorus compounds are also advantageously employed as adjuvants for polymeric aldehydes, e.g., homopolymeric, high-molecular weight formaldehyde.

The present phosphorus compounds are also adjuvants for linear polymers obtained by the self condensation of bifunctional compounds generally, e.g., the polyethers which are derived by the self-condensation of dihydric alcohols such as ethylene glycol, propylene glycol or hexamethylene glycol; the polyesters which are obtained by the self-condensation of hydroxy acids such as lactic acid or 4-hydroxybutyric acid, the polyamides which are prepared by the self-condensation of amino carboxylic acids such as 4-aminobutyric acid or 6-aminocaproic acid; the polyanhydrides which are formed by the self-condensation of dicarboxylic acids such as sebacic acid or adipic acid, etc. The present phosphorus compounds are plasticizing flame-retardants for such self-condensation products, generally; and where transparentizing effect and dye receptivity are lacking, the present compounds are often instrumental in ameliorating such deficiencies.

The present phosphorus compounds are likewise advantageously employed with the silicone resins, i.e., the linear polymers which have the repeating unit:

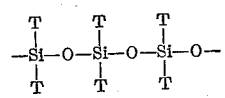

where T denotes an organic radical such as the methyl or phenyl radical, as well as the cross-linked modifications thereof, e.g., cross-linked polymeric divinyltetramethyldisiloxane. The present compounds have a beneficial effect on the mold shrinkage properties and the dimensional stabilities of the thermosetting polymers and also impart plasticizing and transparentizing effects. In bonding and laminate applications tensile strength properties of the siloxane resins are improved.

The invention is further illustrated by, but not limited to, the following examples:

*Example 1*

This example shows the preparation of flame-retardant polyvinyl acetate by incorporating therein the following di- or polyphosphorus compounds:

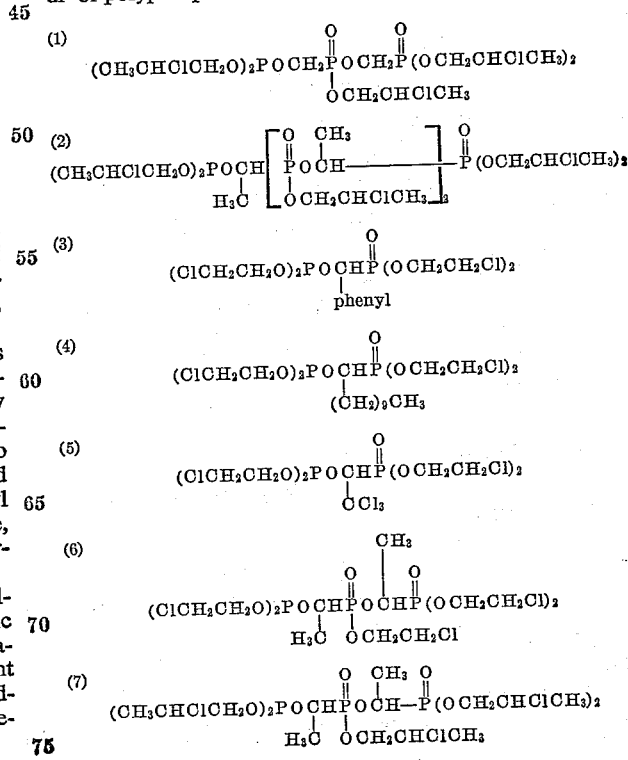

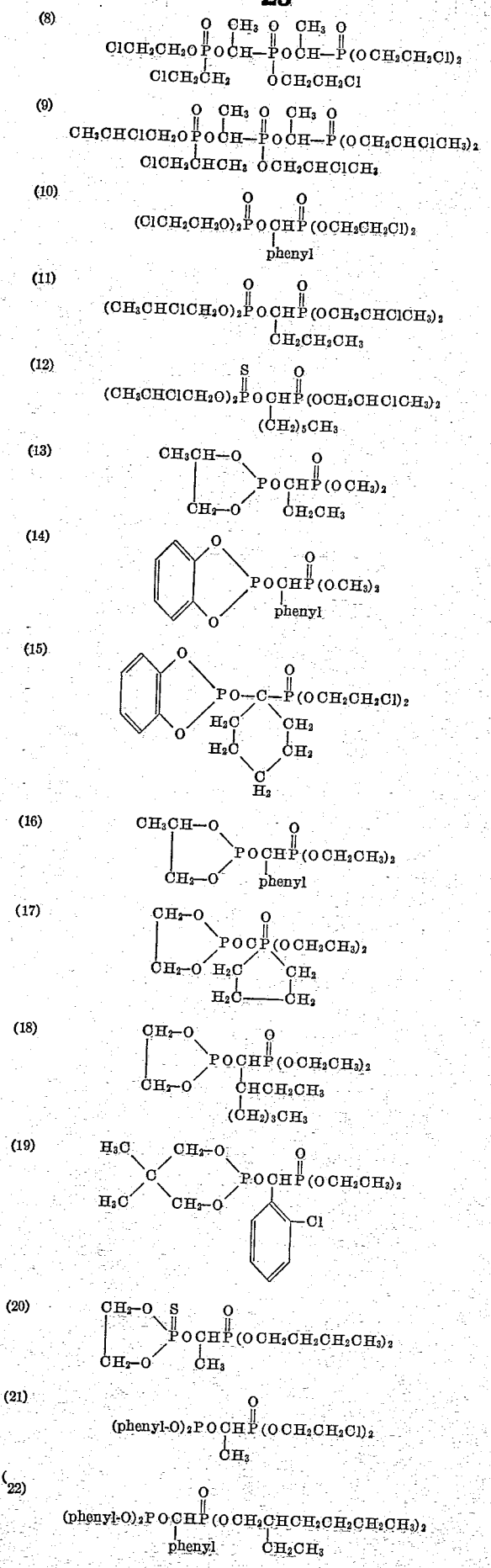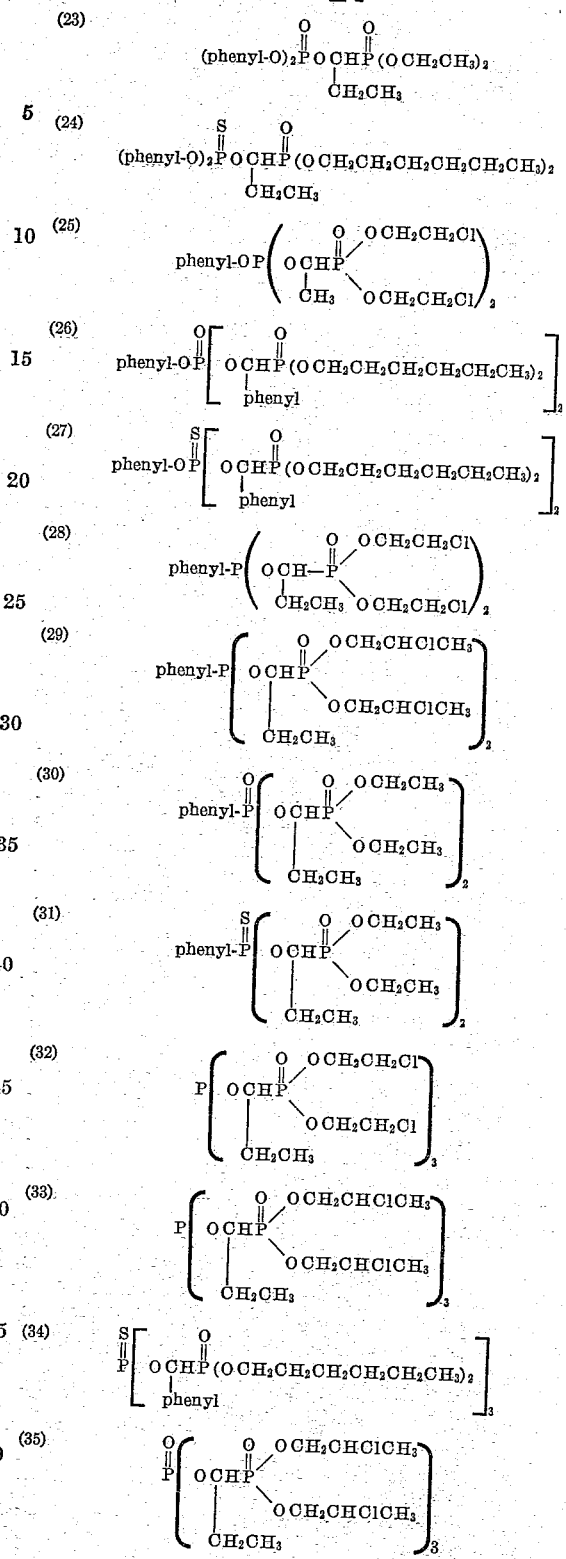

The phosphorus compound was added to a 10% ethylene dichloride solution of the polyvinyl acetate in a quantity which was equal by weight to that of the polyvinyl acetate present in the solution. Films were cast from the resulting mixture and air dried for 24 hours. All of the films were flexible and none ignited when held at the surface of the flame of a Bunsen burner. When held in the flame, combustion occurred, but it ceased as soon as the films were removed from the flame. Incorporation of the present phosphorus compounds into the polyvinyl acetate had thus caused the films to become self-extinguishing.

Example 2

The flame retardant effect of the present phosphorus compounds on polyacrylonitrile (trademarked "Acrilan") was ascertained by adding the compound to a 10% dimethylformamide solution of the poly acrylonitrile, casting films from the resulting mixtures, removing the solvent by drying under the heat lamp, and then testing for flame-proofing by holding the films just outside of the outer cone of the Bunsen burner flame. The compounds 6, 7, 8, 19 and 29–31 of Example 1, each employed in a quantity which was 25% by weight of the total solids, were thus tested. In each case slight charring occurred, but no ignition to flame. On the other hand the flame of a Bunsen burner jumps from the burner to a film of polyacrylonitrile, alone, when the latter is held near the burner flame. The flame-proofed films of this example were all flexible, clear and colorless. No exudation was noted on the film surfaces and no haziness was evidenced in tests of the films conducted with the Photovolt reflection meter.

Example 3

The compounds 1–10, 12–18, 20, 21, 25, 28 and 30–32 of Example 1 were evaluated as flame retardants for homopolymeric ethyl methacrylate. Testing was conducted on films prepared by casting 15% acetone solutions of the homopolymer to which solutions there had been respectively added one of the above compounds in a quantity equal by weight to the polymer content of the solution. After thorough removal of the solvent the films were tested by holding them just outside of the surface of the Bunsen burner flame. None of them ignited. When each of the films was held in the flame, combustion did occur, but it ceased as soon as the film was removed from the flame. Use of the present compounds had thus rendered the polymer self-extinguishing.

Example 4

To a 10% solution of polyvinylidene chloride (known to the trade as "Saran") there was respectively added one of the compounds 3, 7, 10, 19, 26, 30 and 31 of Example 1, in a quantity which was calculated to be 25% by weight of the total solids. Films prepared from the respective solution were free of haze and color and showed no surface exudation. When the films were held in the flame of a Bunsen burner, charring occurred but no ignition. On the other hand, small flames form under the same circumstance from a similarly prepared film of polyvinylidene chloride alone.

Example 5

To 10% solutions of polyvinyl chloride in cyclohexanone there was respectively added each of the compounds 2, 9, 11 and 34 of Example 1 in a quantity which was 25% by weight of the polyvinyl chloride content of the solution.

Films were cast from the resulting solution and the solvent evaporated by air drying at room temperature for about 24 hours. The films thus obtained were clear, colorless, and free of surface exudation. When they were brought to the surface of the Bunsen burner flame, they charred but did not ignite into a flame. When removed from the flame, burning ceased i.e., they were self-extinguishing.

Example 6

The compounds 2, 8, 9, 11, 19, 29, 30, 32, 33 and 35 of Example 1 were respectively added to 5% solutions of a polyvinyl formal ("Formvar") in ethylene dichloride.

The phosphorus compound was used in a quantity which was 25% by weight of the total solids content of the solution. Films cast from the resulting mixture were clear and colorless after air-drying for 24 hours. No surface exudation was noted. When tested for flammability by holding the films just outside of the outer cone of the Bunsen burner flame, there occurred slight charring but no ignition to flame. Films of polyvinyl formal alone, i.e., "controls" prepared in absence of the phosphorus compound, burst into flame under the same circumstance.

Example 7

To a 10% benzene solution of polystyrene there was respectively added each one of the compounds 4, 7, 11, 12, 19, 21–24, 26–28, 30, 31, and 33–35 of Example 1 in a quantity calculated to be 10% by weight of the total solids content.

Films cast from the resulting mixtures and air-dried at room temperature for 24 hours were colorless, transparent and free of haziness as determined by the Photovolt reflection meter. No exudation was present on the film surfaces. They were tested for flammability by holding the film just outside of the outer cone of a Bunsen burner flame. When a similarly prepared film from styrene alone, i.e., one containing no additive, is held in this position, it instantly bursts into flame. On the other hand, films prepared from mixtures containing the 10% concentration of any one of the above phosphorus compounds, as herein described, melted and charred somewhat but did not ignite into flame.

Example 8

This example shows testing of the following compounds as flame-retardant additives for polystyrene:

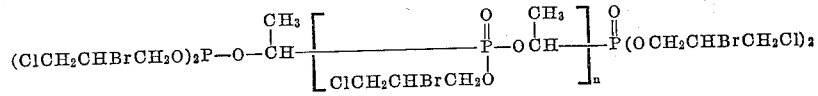

where n is 0.5.

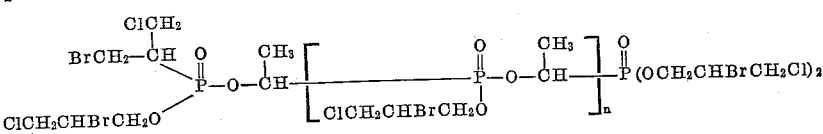

where n is 0.5.

Each of the above compounds was respectively added to finely ground polystyrene granules in a quantity equal to 5% by weight of the polystyrene by blending for 15 minutes in a tumbling type laboratory blender and the mixture extruded through a 1″ single screw extruder at 400° F. into 3/16″ rods.

The extruded rods were then subjected to repeated (3) ignition with a Bunsen burner flame for 15 second periods in a draft-free hood. After each ignition period, upon removal of the flame, the extruded rod was found to be immediately self-extinguishing whereas a "control rod," i.e., a similarly extruded rod of polystyrene containing none of the above compounds, continued to burn rapidly, drip flame, and emit heavy black smoke after the first ignition period.

Example 9

The following compound was tested for flame-retardant effect in polystyrene foam:

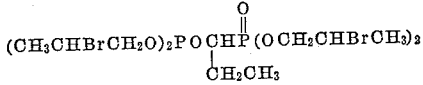

The compound was incorporated into the pneumatogen filled granular polymer at a 5% concentration by blending for 15 minutes in a tumbling type laboratory blender and the composition extruded through a 1" single screw blender at 300° F. The resulting 1¼" diameter polystyrene foam cylinder was cut into 12" lengths and conditioned in a circulating oven at 70° C. for 48 hours to devolatilize residual pneumatogen. The cylinder was then subjected to repeated (3) ignitions with a Bunsen burner flame for 15 second periods in a draft-free hood. After each ignition period, upon removal of the flame, the cylinder was found to be immediately self-extinguishing; whereas a "control cylinder," i.e., a similarly extruded cylinder of polystyrene foam containing none of the above compound, continued to burn rapidly, drip flame, and emit heavy black smoke after the first ignition period.

Example 10

To a 10% solution of a 50:50 molar ratio styrene-methyl methacrylate copolymer in benzene there was respectively added one of the compounds 2, 7, 11, 12, 19, 23, 26–29, 31 and 33–35 of Example 1, in a quantity which was calculated to be 25% by weight of the total solids content. The resulting mixtures were cast into films and the films weer air-dried for 24 hours. Observation of the films at that time showed them to be flexible, clear and colorless, and the film surfaces were free of exudation. Evaluation on the Photovolt reflection meter disclosed no haziness. The films did not ignite into flame when held just outside of the outer cone of the Bunsen burner flame, whereas films prepared from the copolymer alone burst into flame when so positioned.

Example 11

The compounds 2–12, 19, 22, 23, 26, 33 and 35 of Example 1 were respectively added to 10% solutions of a 72:28 styrene-acrylonitrile copolymer in methyl ethyl ketone. The phosphorus compound was used in a quantity which was 25% by weight of the total solids. Films cast from the resulting solutions were clear, colorless, and free of surface exudation. When tested with the Photovolt reflection meter no haziness was noted. The films flamed only when held in the open, luminous flame of the Bunsen burner, but when they were removed from the flame, burning ceased, i.e., the films were self-extinguishing.

Example 12

The compounds of Example 8 were tested for flame-retardant effect in a blend of polystyrene and butadiene-styrene copolymer which blend consisted of 6.5% by weight of the copolymer.

The compounds were respectively incorporated into the granular blend at a concentration of 4% by weight of compound I and at respective concentrations of 3.75% and 7% of compound II by blending for 15 minutes in a tumbling-type laboratory blender. The mixture was then extruded through a 1" single screw extruder at 400° F. into 3/16" rods.

The extruded rods were then subjected to repeated (3) ignitions with a Bunsen burner flame for 15 second periods in a draft-free hood. After each ignition period, upon removal of the flame, the extruded rods were found to be immediately self-extinguishing; whereas a similarly extruded blend of polystyrene and butadiene-styrene copolymer containing none of the above compound continued to burn rapidly, drip flame, and emit heavy black smoke after the first ignition period.

Example 13

This example shows testing of the following compound as a flame-proofing agent for a 72:28 weight ratio styrene-butadiene copolymer known to the trade as SBR rubber:

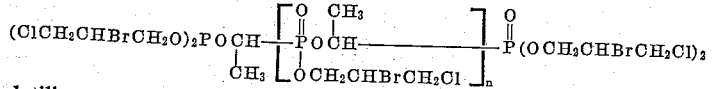

where $n$ has an average value of 0.5.

A mixture consisting of 84.2 parts by weight of the copolymer and 15.8 parts by weight of the above compound was milled into a sheet on a cold, two-roll polymer mill, and a portion of the sheet was pressed into a 2.5" x 0.25" x 0.040" test specimen on the Carver press (4000 p.s.i.; temperature of the platens, 130° C.). Testing of the milled sheet and of the pressed test specimen for flame retardancy showed both to be self-extinguishing, i.e., combustion occurred only while they were held in the Bunsen burner flame and ceased immediately upon withdrawal from the burner flame. On the other hand a milled sheet or a similarly pressed test specimen of the copolymer, alone, continued to burn after withdrawal from the Bunsen burner flame, 0.5 inch of the test specimen being consumed in 21 seconds.

Example 14

The following compounds were tested as ignition retarders for a 72:28 weight ratio styrene-butadiene copolymer rubber:

(A)

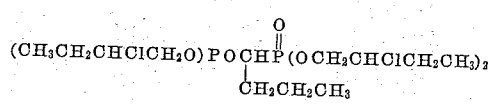

(B)

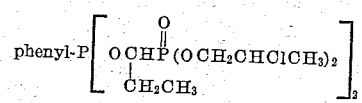

(C)

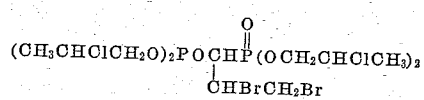

The following mixtures were respectively milled into sheets:

85 parts by weight of copolymer
15 parts by weight of (A)

90 parts by weight of copolymer
10 parts by weight of (B)

86.6 parts by weight of copolymer
13.4 parts by weight of (C)

The milled sheets were compression molded into 2.5" x 0.25" x 0.040" test specimens, and the molded pieces, as well as samples cut from the milled sheets were tested by holding them adjacent to the outer cone of the Bunsen burner flame. In each case the flame did not jump to the tests, whereas the burner flame jumped to and ignited similarly positioned and prepared "controls" of the copolymer, alone. Also, while either the sheeted or molded test samples ignited when they touched the outer cone of the Bunsen burner flame, ignition ceased as soon as the samples were removed from the edge of the burner flame.

Example 15

This example shows testing of the following compounds as flame-retardants for polyethylene:

(A)

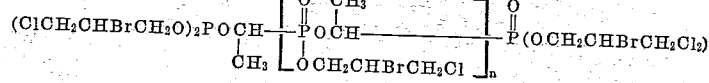

B) 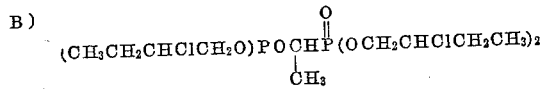

(C) 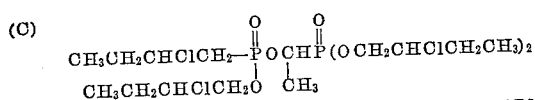

The compounds were respectively milled, at 170° C. on a 2-roll plastic mill, with a polyethylene having an average molecular weight of ca. 20,000, in quantities calculated to give either 8.2% by weight of (A), or 11.2% by weight of (B), or 10% by weight of (C) based on the total weight of polyethylene plus phosphorus compound. The milled sheets thus obtained were respectively pressed at 170° C. on the Carver press into 2.5″ x 0.25″ x 0.040″ test specimens. When the test specimens were held in the flame of the Bunsen burner they were not readily ignited and upon withdrawal from the burner flame, combustion ceased at once, i.e., the test specimens were self-extinguishing. On the other hand a like-dimensioned specimen of polyethylene, alone, is readily ignited and continues to burn after withdrawal from the burner flame.

Example 16

The compounds 1–12, 18, 28, 29, 32, 33 and 35 of Example 1 were evaluated for use as plasticizers for polymeric ethyl methacrylate. Each of said compounds was respectively added at room temperature to a 15% solution of the polymeric methacrylate in a quantity which was equal by weight to the quantity of the polymer, and films were cast from the resulting mixtures. After air-drying for 24 hours the films thus obtained were clear, colorless, and flexible; there was no evidence of oily exudation. Testing of the film by means of the Photovolt reflection meter showed no haziness.

Example 17

The compounds 1–9, 11, 13–15, 19, 21, 33 and 35 of Example 1 were evaluated as plasticizers for polyvinyl acetate. To a 10% solution of the polyvinyl acetate in ethylene dichloride there was respectively added an amount of one of the said compounds which was equal by weight to that of the polyvinyl acetate. Films cast from the resulting mixtures were dried at room temperature for 24 hours. The films thus obtained were flexible, colorless and transparent. No haziness was observed with the Photovolt reflection meter, and no exudation of the phosphorus compound was present on the film surfaces.

Example 18

To a 10% solution of polyacrylonitrile in dimethyl formamide there was added an equal weight, based on the polyacrylonitrile, of one of the compounds 13, 16, 17, 21, and 25 of Example 1. Films cast from the resulting mixture were air-dried 24 hours using a heat lamp. The softened, flexible films which were thus obtained were clear and transparent and colorless. Testing of the films with the Photovolt reflector meter disclosed no haziness and retention of the phosphorus additive was shown by lack of any exudation on the film surface.

Example 19

Films were cast from 10% cyclohexanone solutions of polyvinyl chloride to which had been respectively added at room temperature a quantity of one of the compounds 22, 26, 27, 30, 31 and 34 of Example 1 which was equal by weight to the weight of the polyvinyl chloride. The solvent was allowed to evaporate from the film, and after 24 hours the film was tested for haziness by the Photovolt reflection meter and for exudation of plasticizer by noting surface oiliness. The flexible, colorless transparent film was found to be entirely free of haze and no exudation of the phosphorus compound was evidenced.

Example 20

This example shows preparation of plasticized films from a 1:1 mixture of polyvinylidene chloride and either one of the following compounds:

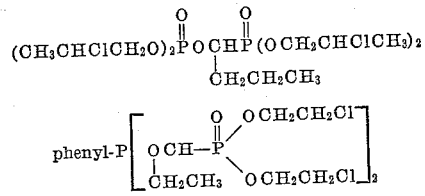

The compound was added in the required quantity at room temperature to a 10% solution of the polymer in methyl ethyl ketone and films were cast from the resulting mixture. Observation of the films after air-drying at room temperature for 24 hours showed them to be flexible, clear, and colorless and free of exudation. No haziness was determined on the Photovolt reflection meter.

Example 21

The compounds 1, 2, 3, 6–9, 11, 14, 16, 21, 25 and 29 of Example 1 were tested as adjuvants for a polyvinyl formal known to the trade as Formvar.

Testing was conducted by respectively adding to a 5% ethylene dichloride solution of the polymer a quantity of one of the above compounds equal by weight to that of the polymer, casting films from the resulting mixtures and air-drying the films at room temperature for 24 hours. The films thus obtained were flexible, clear and colorless. Testing in the Photovolt reflection meter disclosed no haziness and there was no surface exudation.

Example 22

The compounds 5, 11, 12 and 33 of Example 1 were evaluated as plasticizers for a 50:50 styrene-methyl methacrylate copolymer. Films were cast from a 10% benzene solution of the copolymer to which solution there had been added an amount of one of said compounds which was equal by weight to the copolymer content of the solution. After air drying for 24 hours there were obtained clear, colorless films of good flexibility. No haziness was determined on the Photovolt reflection meter and there was no evidence of exudation of the phosphorus compound.

Example 23

This example shows plasticizing of a 72:28 weight ratio styrene-acrylonitrile copolymer. Each of the compounds 2, 7–9, 11 and 35 of Example 1 was respectively added to a 10% solution of the copolymer in ethylene dichloride. A quantity of one of said compounds equal by weight to the copolymer was used. Films cast from the resulting mixture were found, after air-drying at room temperature for 24 hours, to be flexible, transparent and colorless. Testing of the clarity by the Photovolt reflection meter disclosed no haziness and good retention of the phosphorus compound was evidenced by lack of surface exudation.

Example 24

The compounds 2, 4, 5, 7, 9, 11, 22, 23, 26, 29, 31, 33 and 35 of Example 1 were tested for use with a 55:20:25 weight ratio styrene-acrylonitrile-2-ethylhexyl acrylate copolymer.

Films cast from a 5% benzene solution of the copolymer to which solution had been added an equal weight, based on the copolymer, of one of said compounds were allowed to air dry for 24 hours and evaluated. They were found to be flexible, transparent and colorless. Testing with the Photovolt reflection meter disclosed no haziness and the surface of the film showed no oily exudation.

Example 25

The compounds 1-9, 11, 13-19, 28, 33 and 35 of Example 1 were tested as plasticizers for the 1:1 molar ratio copolymer of maleic anhydride and vinyl methyl ether or ethylene. Each phosphorus compound was respectively added to a 15% solution of the ethylene-maleic anhydride copolymer in acetone and to a 7% solution of the vinyl methyl ether-maleic anhydride copolymer in dimethylformamide. The quantity of phosphorus compound employed in each instance was equal by weight to that of the copolymer present in the solution. The resulting mixtures were cast into films and solvent was evaporated from the films at heat lamp temperature. Observation of the films at the end of 24 hours showed them to be flexible, colorless, and transparent. Freedom from haziness was ascertained by the Photovolt reflection meter and excellent retention of the phosphorus compound by lack of exudation on the film surfaces.

Using the above procedure, there were also prepared similarly good films from 1:1 weight ratio mixtures of said vinyl methyl ether-maleic anhydride copolymer and the compounds 21, 22 and 25 of Example 1.

Also, similarly, good films were obtained when the above procedure was employed with 1:1 weight ratio mixtures of said ethylene-maleic anhydride copolymers and one of the compounds.

Example 26

This example shows the stabilizing effect of the present phosphorus compounds on polyvinyl chloride. Various phosphite-phosphonates were tested in the following formulation:

| | Parts by weight |
|---|---|
| Polyvinyl chloride | 100 |
| Dioctyl phthalate | 50 |
| Barium-cadmium laurate | 2 |
| Phosphite-phosphonate | 0.25 |

The ingredients were mixed in a glass vessel and the resulting mixtures milled on the two-roll mill for three minutes at 170° C., sheeted, cooled and then molded into sheets. Molding was conducted according to the method described at pp. 35-36 of "Polymer Evaluation Handbook," U.S. Department of Commerce, Office of Technical Services, 1956 (W.A.D.C. Technical Report 56-399, ASTIA document No. AD 110557, PB 121870), wherein molding is effected between heated platens at an initial pressure of 500 p.s.i. and a final force of 7 tons on a 6″ x 6″ area. After allowing the molded sheets to cool, specimen strips were cut therefrom and exposed in a circulating air oven at 150° C. for 5 hours. No change in color was observed in samples containing any one of the following phosphorus compounds:

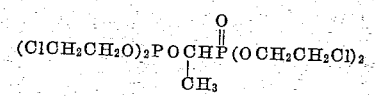

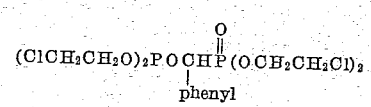

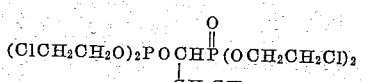

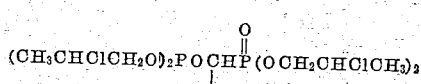

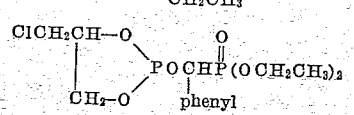

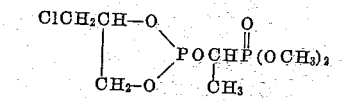

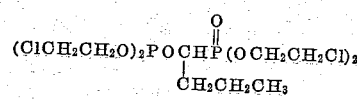

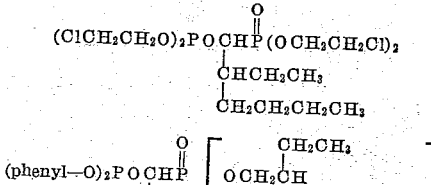

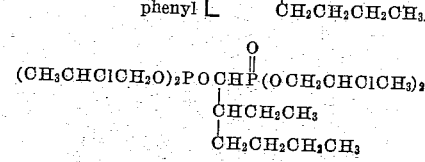

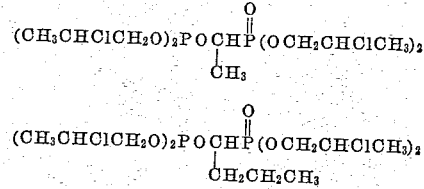

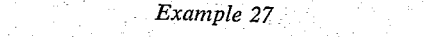

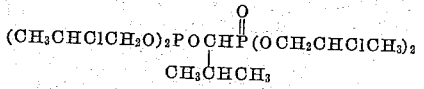

Example 27

This example shows the heat-stabilizing effect on polyvinyl chloride of the following phosphorus compound:

$$(CH_3CHClCH_2O)_2POCHP(OCH_2CHClCH_3)_2$$
$$\qquad\qquad\qquad CH_3CHCH_3$$

The following formulation was prepared and tested:

| | Parts by weight |
|---|---|
| Polyvinyl chloride | 100 |
| Dioctyl phthalate | 50 |
| Above phosphorus compound | 0.42 |
| Barium cadmium laurate | 2 |

After milling for 3 minutes at 100 pounds gauge pressure (approx. 172° C.), the milled mixture was press-polished in a 6″ x 6″ x 0.0625″ mold and molded at 170° C. for a period of time equal to the length of time required for the platens to reach that temperature (170° C.) and at a hydraulic gauge pressure of ca. 1000 p.s.i.

When the molded piece had been allowed to cool to room temperature it was cut into 1″ x 6″ strips, and the latter were placed in a circulating air oven which was maintained at 150° C. Over a 2.5 hour period test samples were cut from the specimens every 15 minutes in order to determine color change if any. Substantially no change in color was noted; whereas a decided, increasingly significant color change was observed for molded specimens prepared in the same way but with triphenyl phosphite instead of the above phosphorus compound.

Example 28

This example describes evaluation of the compounds 1-3, 6-11, 13, 15, 17, 19, 25, 28, 29, 32, 33 and 35 of Example 1 as plasticizers for cellulose acetate.

Testing was conducted as follows: Each of said compounds was respectively added at room temperature to a 12% acetone solution of cellulose acetate, the quantity of said compound being equal by weight to the quantity of the cellulose acetate in the solution. Films were cast from the resulting mixtures, and the solvent was allowed to evaporate. At the end of about 24 hours the films thus obtained were observed to be flexible and there was no evidence of exudation of the phosphorus compounds. Compatibility of the above phosphorus compounds with the cellulose acetate was evidenced by the fact that they were clear and colorless and that no haze was observed when the films were tested by means of a Photovolt reflection meter (model 610) using a triamber filter.

*Example 29*

The use of compounds 2, 8, 16, 21–24, 26, 27, 31 and 34 of Example 1 as adjuvants for ethyl cellulose was demonstrated as follows.

To a 5% ethylene dichloride solution of ethyl cellulose (known to the trade as Ethocell) there was added, respectively, each of said compounds in a quantity which was equal by weight to that of the ethyl cellulose. Films cast from the resulting mixtures were dried by allowing them to stand at room temperature for about 24 hours. At the end of that time they were found to be flexible, colorless and transparent and the surface thereof was free of exudation. No haziness was noted in tests made with the Photovolt reflection meter.

*Example 30*

Nitrocellulose was incorporated with each of the compounds 1–3, 6–9, 11, 19, 24, 26, 27, 30, 34, and 35 of Example 1.

The following procedure was employed: To a 15% solution of nitrocellulose in a mixture of toluene and ethanol there was added one of the above compounds in a quantity equal by weight to that of nitrocellulose present in the solution. Films cast from the resulting mixtures were air-dried for about 24 hours prior to evaluation. They were found to be flexible, colorless and transparent. Testing on the Photovolt reflection meter disclosed no haziness and there was no exudation of phosphorus compound on the film surface.

*Example 31*

The compounds 1, 2, 4–9, 16, 18, 20, 21, 25, 30 and 31 of Example 1 were tested as flame-retarding agents for ethyl cellulose and for cellulose acetate.

Each of said components was respectively added to 12% solutions of cellulose acetate in acetone and to 5% solutions of ethyl cellulose in ethylene dichloride, said phosphorus compound being added in a quantity equal to that of the cellulose present in the solutions. Films cast from the resulting solutions were air dried for evaporation of solvent. None of the films ignited when held just outside of the outer surface of the cone of a Bunsen burner flame. When inserted into the flame, combustion occurred, but it was extinguished spontaneously upon withdrawal from the flame.

In addition to the compounds tested above, the compounds 3, 10, 12, 13, 15, 17, 19, 28, 29, 32, 33 and 35 of Example 1, also gave the same flame-proofing results when tested by the same procedure with ethyl cellulose.

*Example 32*

The following compound was tested for use as a flame retardant for cellulose acetate butyrate and for nitrocellulose.

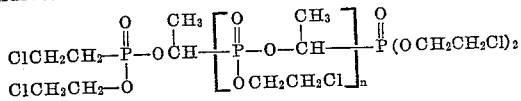

where $n$ has an average value of 2.

In one experiment, a film was cast from a solution containing the cellulose acetate butyrate and 15% by weight, based on total solids content, of the above phosphorus compound. The film was air dried overnight and baked in an oven at 105° C. for 1 to 2 hours. Test strips (100 mm. x 20 mm.) were cut therefrom. A small flame was applied to the lower end of the strip and withdrawn upon ignition. Burning ceased immediately upon withdrawal of the igniting flame. On the other hand for a film of the same cellulose ester, alone, burning continues at a rapid rate to complete consumption of the strip after the igniting flame has been withdrawn.

In another experiment, similarly conducted, a film was cast from a solution containing nitrocellulose and the above compound, the quantity of the latter being 20% by weight of the total solids. That the burning rate of the nitrocellulose was significantly retarded by incorporation of the phorphorus compound was shown by the fact that whereas the time required for the flame to travel the length of the test strip was found to be 12.0 seconds, the flame traveled the length of a like-dimensioned strip of nitrocellulose, alone, in a time of 5.2 seconds.

*Example 33*

This example shows treatment of viscose rayon fabric with the following compounds:

(A)
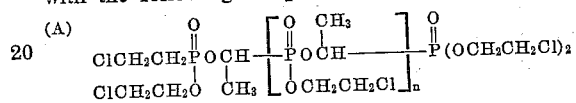

where $n$ has an average value of 2, and (B)
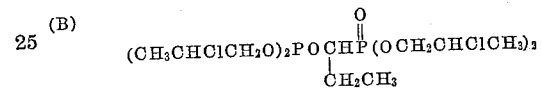

There were prepared chloroform solutions containing either 42% or 27.5% of (A) or 23% of (B). Strips (1.25″ x 6″) of the rayon were respectively dipped into the solutions and then dried at 110° C. for 1 hour. The dried strips were mounted on a wire mesh trough slanted at 45° C. and ignited by the Bunsen burner flame. Upon removal of the flame, combustion ceased; i.e., the treated fabric was self-extinguishing. On the other hand, the same fabric, untreated, continued to burn after withdrawal of the flame until it was completely consumed.

*Example 34*

Flameproofing efficiency of the following compounds was tested against cotton cloth and paper:

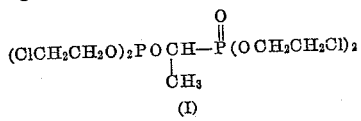
(I)

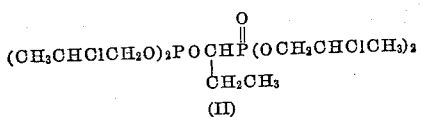
(II)

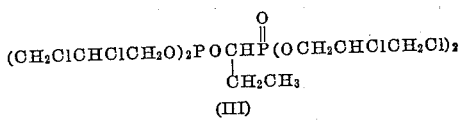
(III)

A 2 x 12 inch strip of desized Indian Head cotton cloth was padded with a 15% acetone solution of the above compound I and dried at room temperature to constant weight. The weight increase of the treated cloth was 20.5%. When held in an open flame, the dried, treated cloth did not support combustion and the length of charring was less than 1.0 inch, i.e., well within the limits set forth by the textile flame-proofing test D626–55T of the American Society for Testing Materials. The hand of the treated cloth was smooth and non-harsh and its color had been not at all affected by the treatment.

Similar testing of the above compound II also showed very good flame-proofing efficiency. When held in the open flame, the treated cloth did not support combustion and gave a char length of only 0.75 inch. Also, when a Whatman No. 1 filter paper was submitted to the same test, there was obtained a non-flammable paper which charred only limitedly.

The use of the above compound III in the flame-proofing test against the cloth gave a char-length of only 0.25 inch. The treated non-flammable cloth was of excellent hand and color. Treatment of the Indian Head cloth with acetone, alone, resulted in readily ignitable, highly flammable material.

*Example 35*

This example describes flame-proofing of various combustible, carbonaceous materials by application of some of the present di- and polyphorphus compounds to the solid materials. The following compounds were tested:

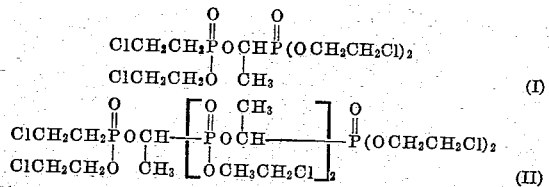

The materials shown below were dipped in 33% by weight solutions of the above compounds in chloroform, air-dried, and then tested for flame-retardancy against the corresponding untreated materials. This was done by holding the materials in the flame of a Bunsen burner until ignition, withdrawing the burner flame and noting whether burning continued. Operating in this manner, burning ceased upon withdrawal of the burner flame from the following materials which had been treated with either the solution of compound I or the solution of compound II;

Cellulose acetate paper
Brown kraft paper
Rayon paper
Polyacrylonitrile paper
White filter paper That the above papers had been rendered self-extinguishing by application of the present compounds is evident from the fact that when the corresponding untreated papers are held in the flame to ignition, upon withdrawal of the burner flame, burning of the papers does not cease.

Application, by dipping, of the solutions of either of the compounds to polyvinyl chloride paper resulted in prevention of blackening and fusion of the paper when held in the Bunsen burner flame. The untreated polyvinyl chloride paper blackens and fuses when so held.

*Example 36*

Samples of hardwood (6" x 1" x 0.025") were immersed for one minute into either an 18.3% chloroform solution or an 11.4% chloroform solution of the following compound:

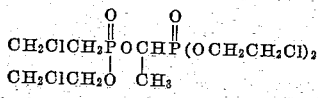

After oven drying overnight at a temperature of 83° C., they were held horizontally in the flame of a Bunsen burner to ignition. Combustion ceased, with no afterglow, as soon as the samples were withdrawn from the flame. "Controls" of the untreated wood or of wood which had been similarly treated with chloroform, alone, continued to burn when withdrawn from the burner flame until they were entirely consumed.

*Example 37*

This example shows testing of compounds 1-8, 13-18, 21, 22, 25, 28, 32 and 35 of Example 1 as plasticizers for melamine-formaldehyde and urea-formaldehyde resins.

The phosphorus compound was respectively added either to a 30% solution of the melamine resin or to a 30% solution of the urea resin in a volatile organic solvent, the quantity of phosphorus compound being 33% by weight of the final film in the case of either the urea or melamine resins. Films cast from the resulting solutions were dried at 140° C. for one hour, and evaluated after being maintained at ordinary atmospheric conditions for about 24 hours. All of the films were substantially colorless and transparent, and none showed exudation of plasticizer on the film surface. Thorough compatibility was further demonstrated by the fact that testing on Photovolt reflection meter disclosed no haziness of the film.

In addition, the melamine-formaldehyde and the urea-formaldehyde resins, were found to give similarly good plasticized films when incorporated in a 1:2 phosphorus compound:resin weight ratio with the compound 10, 12, 16, 27 of Example 1.

Also, like testing of melamine-formaldehyde resin with each of the compounds 20, 23, 24, 30, 31 and 34 of Example 1, in the 1:2 phosphorus compound:resin weight ratio gave similarly good films.

Also, testing of the urea-formaldehyde resin with 30% by weight of each of the compounds 9, 11 and 19 of Example 1 using the testing procedure described above gave films having similar clarity, homogeneity and stability.

*Example 38*

By heating to solution, there was prepared a 10% solution of nylon (Zytel 63) in ethanol. To this there was added a quantity, equal to the weight of the nylon, of the following compound:

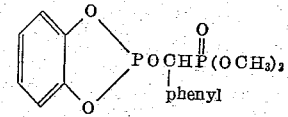

Films were cast from the resulting solution and air-dried using a heat lamp. The films after 24 hours were flexible, clear and transparent. Compatibility of the presently employed phosphorus compound with the nylon was evidenced by the fact that no exudation was noted on the film surfaces and that no haziness was observed with the Photovolt reflection meter.

*Example 39*

This example shows the flame retarding effect of the following compounds on an epoxy resin hardened by phthalic anhydride.

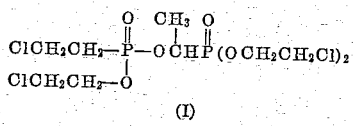

and

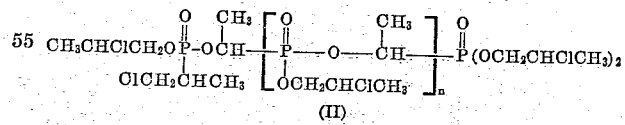

where $n$ has an average value of 0.66.

Respective mixtures consisting of 100 parts by weight of an epoxy resin (Araldite 6020) prepared from bis-phenol (4,4'-isopropylidene-diphenol) and epichlorohydrin, 45 parts by weight of phthalic anhydride and a quantity of one of the above phosphorus compounds equal to 15% by weight of the total weight of the mixture were heated to 120° C. and stirred at this temperature until all of the phthalic anhydride had dissolved. The resulting mixtures were then poured into respective molds which had been heated to about 130° C. and cured in an oven at 160° C. for about 4 hours. A "control" for fire-retardant study was made by the same procedure, except that no additive was used with the epoxy resin and the anhydride.

Test specimens (6" x 0.5" x 0.5") were cut from the cured products. The specimen was placed in a trough of 40 mesh screen which was mounted on a ring stand at a 30° angle, and a 2" high, blue flame of the Bunsen burner was applied to the low end of the specimen and held there for 10 seconds. After removing the burner, the time to self-extinguishment of the specimen flame was noted. At the end of 60 seconds, the "control" specimen, i.e., that which did not contain the phosphorus additive, was still burning with a flame, whereas combustion of the specimens which contained either the above compound I or the above compound II ceased within 22 seconds. Accordingly, the hardened epoxy resin had been rendered self-extinguishing by incorporation of said compounds.

*Example 40*

This example describes preparation of fire-retardant, foamed plastic from a polyalkylene glycol and a diisocyanate.

A prepolymer was formed as follows: 180 g. of polypropylene glycol having a molecular weight of 2000 (Polyglycol P-2000) was blended with 0.6 g. of water for 30 minutes under dry nitrogen. There was then added 32 g. of 2,4-toluylene diisocyanate and the resulting mixture was brought to a temperature of 120° C. within 45 minutes and then held at this temperature for one hour. After cooling to 50° C., an additional 45 g. of the diisocyanate was added, and this was followed by introduction of 14 g. of the following compound

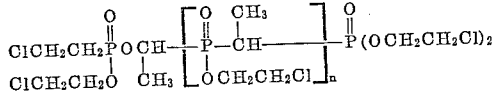

where $n$ has an average value of 2.

To the resulting viscous prepolymer the following were added:

| | G. |
|---|---|
| Silicone oil | 0.2 |
| Water | 1.4 |
| N-methylmorpholine | 0.6 |
| Triethylamine | 0.15 |

Foaming occurred immediately. The foaming mixture was transferred to a mold, and heated first at 70° C. for 20 minutes and then at 120° C. for 3 hours. Testing of the resulting cured product for flame resistance, showed it to be self-extinguishing.

*Example 41*

In the preparation of a flame-proofed polyether flexible foam, 100 parts by weight of a polyalkylene ether triol prepared by condensing glycerin with propylene oxide to a molecular weight of about 3000 was mixed with 38 parts by weight TD-80 (a mixture consisting of 80% 2,4-toluylene diisocyanate and 20%, 2,6-toluylene diisocyanate), 0.5 part by weight stannous octoate, 0.5 part by weight N-ethylmorpholine, 0.05 part by weight triethylene diamine, 1.0 part by weight of polysiloxane oxyalkylene blocked copolymer, 2.9 parts by weight water and 10 parts by weight of the following compound:

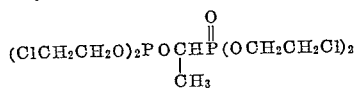

The resulting 2.0 lbs./cu. ft. foam was self-extinguishing. The amove reaction is advantageously conducted by employing the mixing apparatus described in the Hoppe et al. U.S. Reissue Patent No. 24,514.

*Example 42*

In the preparation of a flame-proofed polyether flexible foam, 100 parts by weight of a prepolymer prepared by reacting a mixture of 60 parts by weight of a polyalkylene ether glycol obtained by the condensation of propylene oxide to a molecular weight of about 2000 and 40 parts by weight of a polyalkylene ether triol obtained by condensing glycerin with propylene oxide to a molecular weight of about 3000 with 13.8 parts by weight TD-80 (a mixture consisting of 80% 2,4-toluylene diisocyanate and 20% 2,6-toluylene diisocyanate), at 115° C. until the reaction mixture had a viscosity of 2000 cps. at 73° C. at which time 26.5 parts by weight additional TD-80 was added to produce a prepolymer having an NCO content of 10.6% and a final viscosity of 8500 cps. at 25° C., was mixed with 3.0 parts by weight N-ethyl morpholine, 0.2 part by weight 1-methyl-4-dimethyl aminoethylpiperazine, 1.0 part by weight polydimethyl siloxane having a viscosity of 50 centistokes at 25° C., 2.6 parts by weight water and 10 parts by weight of the following compound:

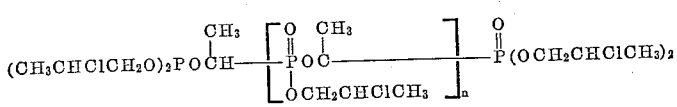

where $n$ has an average value of 0.66. The resulting 2.0 lbs./cu. ft. foam was self-extinguishing.

In effecting the above preparation, the prepolymer can be formed in any suitable tank and then mixed with the other reactants by using the mixing apparatus described in the Hoppe et al. Reissue Patent No. 24,514.

*Example 43*

In the preparation of a flame-proofed polyester flexible foam 100 parts by weight of a polyester prepared by the condensation of diethylene glycol, trimethylolpropane and adipic acid to a molecular weight of about 2500 was mixed with 44 parts by weight of 2,4-toluylene diisocyanate, 2.5 parts by weight N-ethyl morpholine, 1.0 part by weight of an emulsifier obtained from the reaction of diethylamine and oleic acid, 1.5 parts by weight of an emulsifier (Witco 77-86) obtained by blending polyalcohol carboxylic acid esters with sulfonated natural oils, 3.2 parts by weight water and 5 parts by weight of the phosphorus compound tested in Example 41. The resulting 2.0 lbs./cu. ft. foam was self-extinguishing.

Instead of using the reaction product of diethylamine and oleic acid as emulsifier, there may be employed any of the emulsifiers which are disclosed in the Hoppe et al. Reissue Patent No. 24,514.

*Example 44*

In the preparation of a flame-proofed polyester rigid foam 100 parts by weight of a polyester mixture obtained from 80 parts by weight of a polyester prepared by condensing hexane triol, phthalic anhydride, maleic anhydride and adipic acid to a molecular weight of about 1300 and 20 parts by weight of a polyester prepared by condensing phthalic and maleic anhydride, adipic acid, 1,3-butylene glycol and hexane triol to a molecular weight of about 1000 was mixed with 78.3 parts by weight TD-80 (a mixture consisting of 80% 2,4-toluylene diisocyanate and 20% 2,6-toluylene diisocyanate), 0.5 part by weight N-ethyl morpholine, 9.4 parts by weight of an emulsifier composed of 30% water and 70% sulfonated castor oil and 15 parts by weight of the phosphorus compound tested in Example 41. The resulting foam had a density of 2.0 lbs./cu. ft. and was flame-proofed.

*Example 45*

In the preparation of a flame-proofed polyether rigid foam 100 parts by weight of a partial prepolymer prepared by reacting 100 parts by weight of a polyalkylene ether triol obtained by condensing trimethylolpropane with propylene oxide to a molecular weight of about 400 with 240 parts by weight TD-80 (a mixture consisting of 80% 2,4-toluylene diisocyanate and 20% 2,6-toluylene diisocyanate), at 100° C. for about an hour or until the final prepolymer had an NCO content of about 25% and a viscosity of about 3000 cps. at 25° C. was mixed with 44 parts by weight N,N,N',N'-tetrakis (2-hydroxypropyl) ethylendiamine, 20 parts by weight trichloro-monofluromethane, and 0.5 part by weight of a polysiloxane oxyalkylene blocked copolymer and 20 parts by weight of the phosphorus compound tested in Example 42. The resulting foam had a density of 2.0 lbs./cu. ft. and was flame-proofed.

*Example 46*

This example provides a comparison of the following compounds as adjuvants for polyurethane foams:

I. Tetrabromobisphenol
II. Tris(2,3-dibromopropyl) phosphate
III. Tris(2-chloroethyl) phosphate
IV. The product:

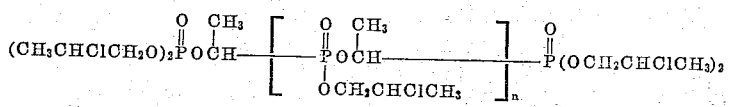

where n has an average value of 0.66.

The compounds were respectively added in 10% concentrations to the mix just before foaming and hardening. In each case all of the components of the reaction mixture and the quantities thereof were the same, except for the variation in the nature of the additives, i.e., either I, II, III, or IV was used, but not any combination of them. Evaluation of the rigid foams thus produced gave the following results.

| Additive | Cell Size | Percent Shrinkage | Density, lb./ft. | Burning rate/min. | Self-Extinguishing |
|---|---|---|---|---|---|
| I | 40 | 10 | 2.5 | 4.8 | no. |
| II | 40 | 20 | 2.4 | 2.9 | no. |
| III | 45 | 10 | 2.6 | 2.5 | no. |
| IV | 45 | 5 | 2.0 | 2.7 | yes. |

It will be noted from the above that only the foam prepared from IV, i.e., one of the presently provided adjuvants is self-extinguishing, that the use of IV results in least shrinkage, and that the use of IV gives a product of least density.

Similarly good results were obtained with flexible polyurethane foams.

*Example 47*

This example shows evaluation of the following compounds with a phenolic varnish in air filter paper application:

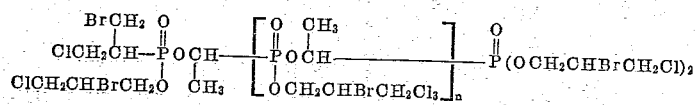

where n has an average value of 0.5.

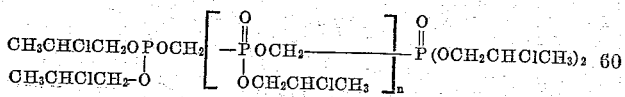

where n has an average value of 0.66, and

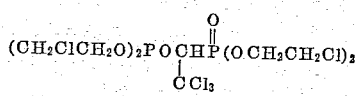

The following formulations were used:

Percent of total solids
One of the above compds _____ 34.5
Phenolic varnish _____ 48.3
Ethyl ammonium phosphate _____ 17.2

The varnish consisted of a base-catalyzed phenol formaldehyde resin in aqueous, denatured alcohol and had a solids content of 65.0±2.0%.

Testing for flame retardancy was conducted as follows:

The respective formulations were diluted with 50% aqueous isopropanol to give a 20% solids content. Test pieces (4" x 4") of air filter paper were respectively dipped into the solution, squeezed between rubber rolls to obtain a resin content of 28.0±2.0%, and cured for 10 minutes at 150° C. All of the cured paper had good water resistance properties, i.e., dripping of cold tap water on the papers showed no impregnation of the treated papers by the water. The flame retardant property of the cured paper was tested by the TAPPI char test (T461-M-48), whereby a strip of the cured paper is held for 12 seconds ¾" above the 1.5 inch flame of a Bunsen burner (air supply off) and the char length measured. By this test a 3 inch char length or less is regarded to show good flame-resistance of resin-impregnated air filter paper. The presently provided cured papers were shown to give a char length of onyl 2⅞". Similarly treated and cured air filter paper prepared in absence of the phosphorus compound but with the same phenolic varnish is not flame retardant.

*Example 48*

This example shows testing of the following phosphorus compound

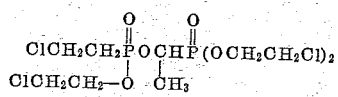

Using the procedure described in Example 34, the following formulations were evaluated as impregnating agents for air filter paper.

Formula A:                          Percent of total solids
  Phenolic varnish _____ 48.3
  Above phosphorus compd _____ 34.5
  Ethyl ammonium phosphate _____ 17.2
  Urea _____ 2.08

Formula B:
  Phenolic varnish _____ 48.3
  Above phosphorus compd _____ 34.5
  Ethyl ammonium phosphate _____ 17.2
  Hexamethylenetetramine _____ 0.725

The varnish consisted of a base-catalyzed phenol-formaldehyde resin in aqueous denatured alcohol and had a solids content of 65%±2.0%. Using the testing procedure described in Example 34, air filter paper prepared with Formula A had a TAPPI char length of 2.75 inches and that prepared with Formula B had a char length of 3.0 inches. The impregnated papers thus obtained had good flexibility, i.e., the cured papers could be bent and pleated without cracking or tearing the paper. This showed good plasticizing effect of the phosphorus compound on the phenolic resin. All of the cured paper had good water resistance properties, i.e., dripping of cold tap water on the papers showed no impregnation of the treated papers by the water. Determination of the stiffness of the cured papers on the Gurley stiffness tester gave a value of 3650 for the cured papers obtained with Formula A and a value of 3350 for that obtained with Formula B. Gurley stiffness loss, determined by substracting the average of the 11th and 12th revolution from the average of the first and second revolution and dividing the resulting difference by the original value gave a value of 14.5% for the paper obtained with (A) and 13.4 for that obtained with (B). These values show cured papers to possess improved strength characteristics.

*Example 49*

This example describes the use of the following compound in a flame-retardant system for air filter paper applications:

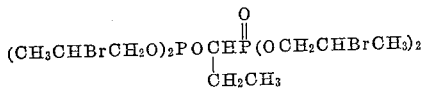

To 4.25 g. of a varnish consisting of a base-catalyzed phenol-formaldehyde resin in aqueous ethanol (47% solids) there was added 2.0 g. of the above compound and 13.75 g. of ethanol to give 20% solids treating system. This was applied to strips of an untreated automotive air filter paper stock. The strips were then cured in a circulating air oven at 150° C. for 10 minutes. The cured paper was flame-retardant, as measured by TAPPI char test (T461-M-48).

*Example 50*

This example shows preparation of laminates which are destined for use in electrical applications.

To 100 parts by weight of a phenol-formaldehyde varnish containing 57% resin solids there was added 13.3 parts by weight of the compound:

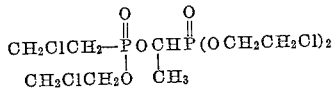

The paper of which the laminates were formed was a 10 mil cotton linter stock which had been pretreated with a phenol-formaldehyde resin of about a 1:1 water dilutability on a standard laboratory paper treated to a resin content of 12% and a volatile content of 2% as determined by heating in an oven for 10 minutes at 160° C. The above described mixture of varnish and phosphorus compound was applied by dipping the pretreated paper into the mixture and then passing the paper over a scraper bar to remove the excess resin. The thus treated paper was dried in an air circulating oven at 120° C. for 23 minutes to a resin content of 56.5% and a volatile content of 4.3%, and it was subsequently laminated (7 plies) at 1200 p.s.i. and 160° C. for 12 minutes. When the laminate thus obtained was ignited by holding it in the flame of a Bunsen burner for 10 seconds, combustion ceased 1.0 second after withdrawal of the burner flame. This shows very good self-extinguishing property. A sample of the laminate was tested for water absorption by immersion in distilled water for 24 hours at 23° C. and determining the difference in weight (American Society for Testing Materials Method D-229). The 0.38% gain in weight thus obtained showed very little water absorption. The insulation resistance of the laminate determined after 96 hours at 35° C. and 90% humidity was found to be $3.3 \times 10^4$ megohms as measured in accordance with American Society for Testing Materials Method D-257.

Another laminate, prepared as above except that the treated paper was kept in the air circulating oven for 20 minutes (rather than 23 minutes) to a volatile content of 4.7% (rather than 4.3%) was found to have a water absorption value of 0.33%. The dielectric constant of the laminate, after soaking in water for 24 hours at 23° C. was found to be 4.82 at 1 megacycle and the power factor after the same conditioning was found to be 0.333 when measured in accordance with American Society for Testing Materials Method D-150.

*Example 51*

The phosphorus compound

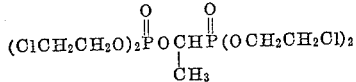

was tested for flame-retardant effect on dicyandiamide-phenol resin and on melamine-phenol resin for use in impregnating air filter paper.

The phosphorus compound was respectively added to isopropanol solutions containing either the dicyandiamide-phenol resin or the melamine-phenol resin in a quantity calculated to be 40% by weight of the total solids. Testing of the resulting solutions as in Example 47 showed all of the treated papers to have very good water-resistance and to be self-extinguishing. A TAPPI char length of 2.5″ was obtained with the dicyandiamide-phenolic impregnating agent to which the above phosphorus compound had been added, and a 2.875″ TAPPI char length was obtained with the melamine-phenolic impregnating agent to which the compound had been added.

As is obvious from the above examples, the present phosphorus compounds are valuable adjuvants for polymeric materials, generally. The manner in which they are incorporated into or applied to the polymeric materials will depend upon the individual nature of the polymer and upon its physical form; but it is generally that which is customarily employed when the same polymers in the same physical form are contacted with prior art adjuvants. Thus when a polymer is to be employed in coatings or impregnating agents or for the production of films, additions are usually introduced into the solutions or dispersions of the finished polymer, unless the polymer is of the thermosetting type, in which case the additive may be mixed with the prepolymer and hardening or cross-linking agent previous to curing.

When the polymer is to be used for the preparation of fibers, the additive may be introduced into the extrusion melt or into the solutions from which the fibers are formed; however, for many purposes a treating agent is often applied to fibrous materials by immersing either the fibers or textiles made therefrom into baths containing the agent. When the polymer is to be molded, the additive is usually incorporated by milling with the hard, finished polymer previous to molding by pressure. However, here again, the point at which the additive is introduced will vary with the nature of the polymer; for example, in the case of polymers which are cross-linked or in the case of thermosetting polymers, the additive is more advantageously introduced together with the cross-linking agent or with the hardening agent previous to the final molding step. When the polymer is to be employed in the production of hardened foams the additive is generally added to the mix which is to be foamed; however, in the case of foam jet extrusion or pneumatogen injection extrusion, the additive may be added just before the extrusion step. For the preparation of foams, particularly the polyurethane foams, additives are also frequently added in the art previous to the esterification reaction. The point at which the present phosphorus compounds are added or applied to the polymer is thus determinable by current practice in the specific arts.

As is also obvious from the above examples the present phosphorus compounds are capable of conferring a variety of beneficial effects when contacted with the polymeric materials. While a prime interest is the rendering of combustible polymers flame retardant, flame retardancy is definitely not the only effect. Thus, plasticizable polymers are often plasticized by the present phosphorus compounds when employed in the flame-proofing quantity; and when substantially no plasticizing effect is observed at the minimum quantity of the phosphorus compound required to impart flame retardancy, the use of larger amounts of the compound does give plasticizing effect. Of interest is the fact that polymeric materials of poor dyeing properties are generally rendered dye receptive polymer. Also of interest is the fact that when the present compounds are employed with fibers and textiles for the purpose of flame retardancy, there is also attained improvement in hand and feel of the treated materials: the present compounds are thus sizing and anti-fulling agents. Anti-static properties are also imparted, wet-strength is increased and water-repellency is exhibited. When used in mixes that are to be extruded into fibers, fracture resulting from extrusion through the capillaries is minimized. When incorporated into films or moldings, the present phosphorus compounds possess an anti-clouding and clarity producing or transparenting effects. Still another effect imparted to specialty films by the present phosphorus compounds is anti-blocking property. Incorporation of the present compounds into polymeric impregnating and adhesive agents destined for use in laminates results in laminated products having very good mechanical and electrical properties. Also, when such laminates, particularly those prepared with phenolic impregnating agents comprising the present phosphorus compounds, are employed for the manufacture of gears and other sliding members, the manufactured products are characterized by possessing a very low coefficient of friction. The present phosphorus compounds are generally valuable as either flame retarders or plasticizers, or both, for resin-base protective coatings and for rapid-dry printing inks. When used in electrical insulating coatings, the power factor values and water absorption properties of the untreated resin base are substantially unaffected. Resinous products comprising the present phosphorus compounds are useful in electrical printed circuit applications.

Since the quantity of the present phosphorus compounds which is employed with the polymeric material will vary with the adjuvant effect sought, with the nature of the polymer and the nature of the individual adjuvant, it is evident that no rigid limits of adjuvant content can be set forth. For many purposes, particularly in heat- and light-stabilizing effects, very low quantities, say, quantities of as low as 0.01% by weight based on the weight of the polymer, are satisfactory. For other purposes, e.g., plasticizing effect, concentrations which are about equal to the weight of the polymer give the best results. Determination of the optimum quantities is readily conducted by routine procedures, as will be apparent to those skilled in the art. Variations or modifications of the compounds and quantities employed in the examples can be made to accommodate different requirements, so long as the compound belongs to the general class of phosphorus compounds hereinbefore defined and is not used in quantities greater than the polymer which is to be modified. The same processes as illustrated in the above examples have been found to be satisfactory for producing additional examples, e.g., by employing, say, a hundred of the present compounds with the polyvinyl acetate of Example 1, instead of the 35 compounds shown therein; or by employing different vinyl polymers, or different phenolic, alkyd, epoxy polyester, polyamide or polyurethane resins than those used in the examples. However, it is believed that no purpose will be shown by further multiplying the examples.

Although the present phosphorus compounds confer a variety of beneficial properties to polymeric materials, they may be used with other additives which are customarily employed as adjuvants for polymeric materials. Inasmuch as the present phosphorus compounds are substantially unreactive with the usual, commercially available polymer adjuvants, the use of such adjuvants with the present phosphorus compounds is permissible and in many instances is desirable, e.g., fillers, dyes, cross-linking agents, foam producing agents, fungicides, etc. may be used.

The modified polymeric materials of this invention may be molded, extruded, calendered, spread, or sprayed. Typical applications for the materials include molded, cast or extruded objects, continuous sheetings, tubing, fibers, films, wire coatings, textile coatings, laminates, paints, varnishes and enamels, wood preservatives, adhesives, and caulking compounds.

Other modes of applying the principles of this invention may be employed instead of those specifically set forth above, changes being made as regards the details herein disclosed, provided the elements set forth in any of the following claims, or equivalents thereof be employed.

What I claim is:

1. A composition comprising an organic polymer in contact with not more than an equal amount, based on the weight of the polymer, of an adjuvant which is an organic compound of the formula

where $n$ is a number of 0 to 2, $m$ is a number of 0 to 100 when $n$ is 2 and 0 when $n$ is less than 2, Y is selected from the class consisting of $\equiv P-$, $\equiv P=O$ and $\equiv P=S$, each R is selected from the class consisting of hydrocarbyl, halohydrocarbyl, alkoxyhydrocarbyl, and (hydrocarbyloxy)-halohydrocarbyl radicals of from 1 to 12 carbon atoms and such radicals linked to the phosphorus atom of Y by an element selected from the class consisting of $-O-$ and $-S-$ and wherein two R's taken together stand for a radical selected from the class $-O$-hydrocarbylene-$O-$ and $-O$-halohydrocarbylene-$O-$ radicals which are free of aliphatic unsaturation and which contain from 2 to 10 carbon atoms; R''' is selected from the class consisting of hydrocarbyl, halohydrocarbyl, alkoxyhalohydrocarbyl and hydrocarbyloxyhalohydrocarbyl radicals of from 1 to 12 carbon atoms and such radicals linked to the phosphorus atoms by an element selected from the class consisting of $-O-$ and $-S-$; Z is selected from the class consisting of hydrogen, hydrocarbyl, halohydrocarbyl, carboalkoxyhydrocarbyl, alkylthiohydrocarbyl, alkoxyhydrocarbyl, and cyanohydrocarbyl radicals of from 1 to 17 carbon atoms when $n$ is 2 and from 1 to 10 carbon atoms when $n$ is less than 2, and the furyl and thienyl radicals; and R' and R'' are selected from the class consisting of alkyl, haloalkyl, aryl, haloaryl, alkoxy, haloalkoxy, and (hydrocarbyloxy)haloalkoxy radicals of from 1 to 12 carbon atoms.

2. The composition defined in claim 1 further characterized in that the polymer is cellulosic.

3. The composition defined in claim 1, further characterized in that the polymer is a vinyl polymer.

4. The composition defined in claim 1 further characterized in that the polymer is a synthetic polymer.

5. The composition defined in claim 1, further characterized in that the polymer is a natural polymer.

6. The composition defined in claim 1, further characterized in that the polymer is an acrylonitrile polymer.

7. The composition defined in claim 1, further characterized in that the polymer is a polyurethane.

8. The composition defined in claim 1, further characterized in that the polymer is a phenol-aldehyde resin.

9. An organic material comprising a polyurethane foam resin and not more than an equal amount, based on the weight of the resin, of the compound:

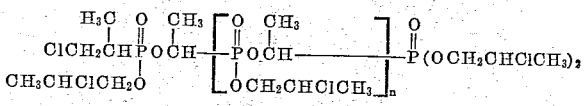

where $n$ is an average value of 0.66.

10. An organic material comprising polyvinyl chloride and not more than equal amount, based on the weight of the polymer, of the compound:

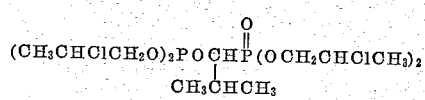

11. An organic material comprising a phenol-formaldehyde resin and not more than an equal amount, based on the weight of the resin, of the compound

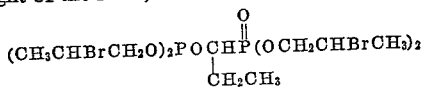

where $n$ is an average value of 0.5.

12. An organic material comprising an acrylonitrile polymer and not more than an equal amount, based on the weight of the polymer of the compound:

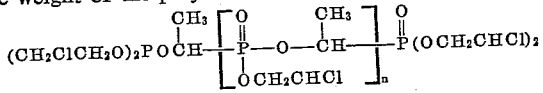

where $n$ is an average value of 2.

13. An organic material comprising polystyrene and not more than an equal amount, based on the weight of the polymer of the compound:

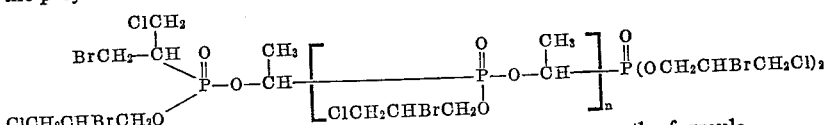

where $n$ is an average value of 0.5.

14. The composition defined in claim 1, further limited in that $m$ is zero.

15. The composition defined in claim 1, further limited in that Y is $=P-$.

16. The composition defined in claim 1, further limited in that Y is $=P=O$.

17. The composition defined in claim 1, further limited in that Y is $=P=S$.

18. An organic material comprising a synthetic polymer in contact with not more than an equal amount, based on the weight of the polymer, of an adjuvant which has the formula

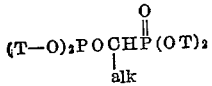

in which T denotes a haloalkyl radical of from 1 to 12 carbon atoms and alk denotes an alkyl radical of form 1 to 17 carbon atoms.

19. An organic material comprising a synthetic polymer in contact with not more than an equal amount, based on the weight of the polymer, of an adjuvant which has the formula

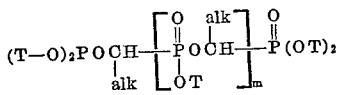

in which T denotes a haloalkyl radical of from 1 to 12 carbon atoms, alk denotes an alkyl radical of from 1 to 17 carbon atoms, and $m$ is a number of 0 to 100.

20. A resinous composition comprising a polyurethane in contact with not more than an equal amount, based on the weight of the polyurethane, of an adjuvant having the formula

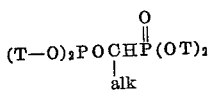

in which T denotes a haloalkyl radical of from 1 to 12 carbon atoms and alk denotes an alkyl radical of from 1 to 17 carbon atoms.

21. A resinous composition comprising a polyurethane in contact with not more than an equal amount, based on the weight of the polyurethane, of an adjuvant having the formula

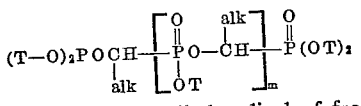

in which T denotes a haloalkyl radical of from 1 to 12 carbon atoms, alk denotes an alkyl radical of from 1 to 17 carbon atoms, and $m$ is a number of 0 to 100.

No references cited.